(12) United States Patent
Soulieres et al.

(10) Patent No.: US 12,040,610 B2
(45) Date of Patent: Jul. 16, 2024

(54) POWER CONTROL DEVICE AND RELATED METHODS

(71) Applicants: SYSTEMEX-ENERGIES INC., Mont Royal (CA); HYDRO-QUEBEC, Montreal (CA)

(72) Inventors: Sylvain Soulieres, Montreal (CA); Simon Jasmin, Montreal (CA); Francois Laurencelle, Trois-Rivieres (CA); Alain Moreau, Shawinigan (CA); Claude Villemure, Trois-Rivieres (CA); Stephane Boyer, Trois-Rivieres (CA)

(*) Notice: Subject to any disclaimer, the term of this patent is extended or adjusted under 35 U.S.C. 154(b) by 36 days.

(21) Appl. No.: 17/563,169

(22) Filed: Dec. 28, 2021

(65) Prior Publication Data

US 2022/0263316 A1 Aug. 18, 2022

Related U.S. Application Data

(63) Continuation of application No. 16/301,083, filed as application No. PCT/CA2017/050563 on May 10, 2017, now abandoned.
(Continued)

(51) Int. Cl.
*H02J 3/00* (2006.01)
*H02J 3/06* (2006.01)
(Continued)

(52) U.S. Cl.
CPC .............. *H02J 3/002* (2020.01); *H02J 3/06* (2013.01); *H02J 3/14* (2013.01); *H02J 3/24* (2013.01); *H02J 3/241* (2020.01); *H02J 2310/14* (2020.01); *Y02B 70/3225* (2013.01); *Y04S 20/222* (2013.01)

(58) Field of Classification Search
CPC ...... H02J 3/002; H02J 3/06; H02J 3/14; H02J 3/24; H02J 3/241; H02J 2310/14; H02J 2310/12; Y02B 70/3225; Y02B 70/30; Y04S 20/222; Y04S 20/242
See application file for complete search history.

(56) References Cited

U.S. PATENT DOCUMENTS 8,468,404 B1 * 6/2013 Chickermane ............................. G01R 31/318575
714/742
2002/0154000 A1 * 10/2002 Kline ..................... G02B 6/483
340/539.1
(Continued)

*Primary Examiner* — Rexford N Barnie
*Assistant Examiner* — Thai H Tran

(57) ABSTRACT

A power control device for use in an AC power grid for regulating an electrical power a load that is supplied by the AC power grid consumes. The power control device has a frequency sensing functional block for detecting a deviation of the grid frequency from a nominal grid frequency and a logic functional block for performing a load adjustment process during which the power the load consumption is reduced. The load adjustment process is based at least in part on the variation of the frequency of the AC power grid. The load adjustment process is design such that for a plurality of power control devices the individual response produce a grid-wide effect that compensates imbalance between power generation and load in fashion that may reduce unwanted distortion in the AC power grid, such as flicker.

17 Claims, 17 Drawing Sheets

Related U.S. Application Data

(60) Provisional application No. 62/334,161, filed on May 10, 2016.

(51) Int. Cl.
*H02J 3/14* (2006.01)
*H02J 3/24* (2006.01)

(56) References Cited

U.S. PATENT DOCUMENTS

| | | | | |
|---|---|---|---|---|
| 2004/0188416 A1* | 9/2004 | Cao | ............... | G03G 15/2039 |
| | | | | 219/492 |
| 2012/0007570 A1* | 1/2012 | Valenti | ............ | H02M 5/2573 |
| | | | | 323/235 |
| 2013/0320762 A1* | 12/2013 | Trudel | .................. | H02J 3/14 |
| | | | | 323/205 |

* cited by examiner

| Frequency Deviation (Hz) | Controlled Load (% of rated value) |
|---|---|
| 0 | 100 |
| -0.25 | 80 |
| -0.5 | 60 |
| -0.75 | 40 |
| -1.0 | 20 |
| -1.25 | 0 |

| Controlled Load 50% | | | |
|---|---|---|---|
| Delay Time | | Load Reduction Time | |
| Cycles | Milliseconds | Cycles | Milliseconds |
| (1) 0.25 | 4.166 | 0.25 | 4.166 |
| (2) 0.125 | | | |
| (3) ... | ... | ... | ... |

FIG. 16

| 1 Second Window | |
|---|---|
| Controlled Load (% of rated value) | Number of Cycles |
| 0 | 0 |
| 20 | 12 |
| 40 | 24 |
| 50 | 30 |
| 60 | 36 |
| 80 | 48 |
| 100 | 60 |

FIG. 17

| | 1 Second Window | | | | | | | | | |
|---|---|---|---|---|---|---|---|---|---|---|
| | 10% | 20% | 30% | 40% | 50% | 60% | 70% | 80% | 90% | 100% |
| (1) | ... | ... | ... | ... | 3,6,8,10... | ... | ... | ... | ... | ... |
| (2) | ... | ... | ... | ... | 1,2,8,9... | ... | ... | ... | ... | ... |
| (3) | ... | ... | ... | ... | 2,5,9... | ... | ... | ... | ... | ... |
| ... | ... | ... | ... | ... | ... | ... | ... | ... | ... | ... |

FIG. 18

POWER CONTROL DEVICE AND RELATED METHODS

FIELD OF THE INVENTION

The present invention relates to a controller for controlling the electrical power transferred between an AC power grid and an external device.

BACKGROUND OF THE INVENTION

To ensure the reliability of an electric power grid, the utility continually maintains a power reserve to compensate for a possible failure of electrical generation units. The power reserve is essentially an excess production capacity on standby. In normal conditions, the power generation units are run at less than 100% such that a degree of reserve power is always available. However, the maintenance of this reserve capacity is an expensive proposition since the reserve constitutes a resource that cannot be effectively monetized by the utility company.

An AC power grid will operate in normal conditions at a fixed frequency (usually 50 or 60 Hz). The frequency remains constant as long as the supplied power matches the power consumed by the load. Any sudden changes in generation or load resulting in an imbalance between generation and load will lead to a frequency instability during which the frequency deviates from its nominal value. Large frequency variations are undesirable because they could lead to equipment trip or even a system collapse.

Frequency instability events are generally caused by the sudden loss of an electrical generation unit or by the loss of a large load and are characterized by a sudden frequency variation from the frequency nominal value.

The reserve capacity in a power grid is thus tapped when the frequency drops below a certain level. Electrical generation units that supply power to the grid are equipped with a speed governor. The speed governor continuously regulates the power output of generation units to balance the generation with the load. Thus, when the frequency of the power grid varies, the speed governor responds to this variation to compensate it. For example, when the frequency is higher than normal, the speed governor will simply lower the power generated by the generation unit (therefore reducing the amount of power supplied to the grid). Alternatively, when the frequency is lower than normal, the speed governor will increase the power generation. The speed governor, however, has some inherent limitations. In particular, it is slow to respond since it involves certain mechanical operations. Depending of the type of generation (hydraulic, gas, thermal, wind, etc.), some time is required for the generation unit to adjust its speed up to the desired point.

System inertia is another aspect to frequency stability of the AC power grid. "Inertia" refers to the ability of the grid to buffer imbalances, such as excess power generation or power generation deficit and thus prevent significant and rapid frequency excursions. Any AC power grid has a level of inherent inertia. This inherent inertia effect is the result of the energy stored in the AC power grid that builds up or bleeds off to buffer the imbalance, depending on whether the imbalance is the result of an excess or deficit of power generation. Most of this energy is the kinetic energy of the power generators. When the AC power grid experiences a significant imbalance due to a power generation deficit, kinetic energy will be tapped and converted in electricity to feed the load, thus compensating the power generation deficit temporarily. As the kinetic energy bleeds off, the power generators will slow down causing the frequency to deviate from its nominal value. The rate of deviation of the frequency is thus dependent on the rate of kinetic energy depletion. Accordingly, from the perspective of frequency stability, some level of inertia in the power grid is desirable because it acts as a mechanism to dampen frequency variations and thus provides more time for slower frequency stabilization systems to become active.

Power controller devices for controlling the electrical power transferred between an AC power grid and an electrical load are known. For example, a known power controller device is described in PCT International Publication No. WO 2013/177689 (hereinafter the "'689 application"), the contents of which are hereby incorporated by reference. When a large number of power controllers of the type described in the '689 application are installed in an electrical network or grid, each of them is configured to respond independently to a frequency instability to reduce the amount of power that the individual electrical load consumes. In this fashion, while each power control device operates autonomously, the responses are coherent and synchronous, creating an aggregate load reduction effect, which in practice works as a reserve, but on the load side of the AC power grid. When a frequency instability arises due to an imbalance between the power generation and load, the load, instead of being static, dynamically responds by reducing itself to compensate fully or partially this imbalance.

In general, the power electronics of the power controller are configured to lower the RMS (root mean square) voltage supplied to the electrical load, in order to lower its electrical consumption, which may involve simply chopping-off segments of the voltage waveform. To determine the portion of the voltage waveform to chop-off to achieve the target RMS value, the power controller relies on the voltage zero crossings as reference points. The zero crossings are points where the voltage waveform changes from a positive to a negative value (and/or from a negative to a positive value) and are represented by crossing of the zero value. The portion of the waveform to be chopped-off is established with relation to those reference points. However, since the reference points are the same for each power controller (the zero crossings occur at the same instant everywhere in the AC power grid since every power controllers react at the same frequency change) the exact same portion of the waveform is chopped-off by every power controller. This creates a disadvantage, in certain circumstances. When the power controllers collectively remove the same segment of the waveform, this can create unwanted distortions in the AC power grid, such as flickering.

In light of the above, there is a need in the industry for providing an improved power controller device and improved methods for operating such power controller device.

SUMMARY OF THE INVENTION

In accordance with a broad aspect, a power control device for use in an AC power grid for regulating an electrical power a load that is supplied by the AC power grid consumes is provided. The power control device has a frequency sensing functional block for detecting a deviation of the grid frequency from a nominal grid frequency and a logic functional block for performing a load adjustment process during which the power the load consumption is reduced. The load adjustment process is based at least in part on the variation of the frequency of the AC power grid. The load adjustment process is design such that for a plurality of power control devices the individual response produce a grid-wide effect that compensates imbalance between power generation and load in fashion that may reduce unwanted distortion in the AC power grid, such as flicker.

In accordance with another broad aspect, a method for reducing aggregate load creep-up in a power distribution network which supplies an aggregate load including a plurality of individual loads controlled by respective power control devices, the power control devices being responsive to a power generation deficit in the power distribution network to reduce an electrical consumption of the respective loads to a level selected according a magnitude of the imbalance, the method including an act performed by each of the plurality of the power control devices subsequent the reduction of electrical consumption to the selected level, the act including progressively reducing the electrical consumption below the selected level to reduce a likelihood of aggregate load creep-up.

In accordance with another broad aspect, a power control device for reducing aggregate load creep-up in a power distribution network which supplies an aggregate load including a plurality of individual loads, the power control device configured for controlling an electrical consumption of a respective load among the plurality of individual loads, the power control device comprising:
  a. one or more processors;
  b. a machine readable storage encoded with software for execution by the one or more processors, the software defining an electrical consumption control logic operative for:
    i. in response to a power generation deficit in the power distribution network to reduce an electrical consumption of the respective load to a level selected according a magnitude of the imbalance;
    ii. subsequent the reduction of electrical consumption to the selected level, progressively reducing the electrical consumption below the selected level to reduce a likelihood of aggregate load creep-up when a plurality of the power control devices autonomously control the electrical consumption of the respective ones of the individual loads.

In accordance with another broad aspect, a power control device for use in a power distribution network supplying electrical energy to a plurality of individual loads, the power control device for use in controlling an electrical consumption of an individual load among the plurality of individual loads, the power control device comprising:
  c. an input for receiving information identifying a presence of a power generation deficit in the power distribution network;
  d. a control entity;
  e. power electronics for regulating a supply of electrical energy from the power distribution network to the individual load, the supply of electrical energy having sinusoidal voltage cycles, each sinusoidal voltage cycle including a positive half-cycle and a negative half-cycle, the control entity, configured for:
    i. in response to a power generation deficit in the power distribution network, selecting a reduced non-nil electrical consumption level for the individual load among a plurality of possible reduced non-nil electrical consumption levels;
    ii. determining a combination of half-cycles to block from the electrical energy supplied to the individual load corresponding to the selected reduced non-nil electrical consumption level;
    iii. control the power electronics according to the determining to achieve the selected reduced non-nil electrical consumption level.

In accordance with another broad aspect, a method for regulating a supply of electrical energy from a power distribution network to an individual load, the supply of electrical energy having sinusoidal voltage cycles, each sinusoidal voltage cycle including a positive half-cycle and a negative half-cycle, the method comprising:
  f. accessing information identifying a presence of a power generation deficit in the power distribution network;
  g. executing software by one or more processors to implement a control entity, configured for:
    i. in response to a power generation deficit in the power distribution network, selecting a reduced non-nil electrical consumption level for the individual load among a plurality of possible reduced non-nil electrical consumption levels;
    ii. determining a combination of half-cycles to block from the electrical energy supplied to the individual load corresponding to the selected reduced non-nil electrical consumption level;
    iii. control power electronics in an electrical energy supply path from the power distribution network to the individual load, according to the determining to achieve the selected reduced non-nil electrical consumption level.

In accordance with another broad aspect, a power control device for use in a power distribution network supplying electrical energy to a plurality of individual loads, the power control device for use in controlling an electrical consumption of an individual load among the plurality of individual loads, the power control device comprising:
  h. an input for receiving information identifying a presence of a power generation deficit in the power distribution network;
  i. a control entity;
  j. power electronics for regulating a supply of electrical energy from the power distribution network to the individual load, the supply of electrical energy having sinusoidal voltage cycles, each sinusoidal voltage cycle including a positive half-cycle and a negative half-cycle, the control entity, configured for:
    i. in response to a power generation deficit in the power distribution network, selecting a reduced non-nil electrical consumption level for the individual load among a plurality of possible reduced non-nil electrical consumption levels;
    ii. control the power electronics to reduce an RMS voltage of the supply of electrical energy to the individual load to achieve the selected reduced non-nil electrical consumption level without introducing a DC component in the supply of electrical energy to the individual load.

In accordance with another broad aspect, a method for regulating a supply of electrical energy from a power distribution network to an individual load, the supply of electrical energy having sinusoidal voltage cycles, each sinusoidal voltage cycle including a positive half-cycle and a negative half-cycle, the method comprising:
  k. accessing information identifying a presence of a power generation deficit in the power distribution network;
  l. executing software by one or more processors to implement a control entity, the control entity, configured for:
    i. in response to a power generation deficit in the power distribution network, selecting a reduced non-nil electrical consumption level for the individual load among a plurality of possible reduced non-nil electrical consumption levels;
ii. control the power electronics to reduce an RMS voltage of the supply of electrical energy to the individual load to achieve the selected reduced non-nil electrical consumption level without introducing a DC component in the supply of electrical energy to the individual load.

In accordance with another broad aspect, a power control device for controlling an electrical consumption of an electrical load supplied by a power distribution network, the power control device comprising:
m. an input for receiving information identifying a presence of a power generation deficit in the power distribution network;
n. a control entity;
o. power electronics for regulating a supply of electrical energy from the power distribution network to the individual load, the supply of electrical energy having sinusoidal voltage cycles, each sinusoidal voltage cycle including a positive half-cycle and a negative half-cycle, the control entity, configured for:
 i. in response to a power generation deficit in the power distribution network, selecting a reduced non-nil electrical consumption level for the individual load among a plurality of possible reduced non-nil electrical consumption levels;
 ii. control the power electronics to reduce an RMS voltage of the supply of electrical energy to the individual load to achieve the selected reduced non-nil electrical consumption level while maintaining flicker in the supply of electrical energy to a level acceptable as defined in anyone of International Electrotechnical Standards IEC 61000-3-3, IEC 61000-3-11 and/or IEC 61000-3-12.

In accordance with another broad aspect, a method for controlling an electrical consumption of an electrical load supplied by a power distribution network, the method comprising:
p. accessing information identifying a presence of a power generation deficit in the power distribution network;
q. an act of regulating a supply of electrical energy from the power distribution network to the individual load, the supply of electrical energy having sinusoidal voltage cycles, each sinusoidal voltage cycle including a positive half-cycle and a negative half-cycle, the control entity, the act of regulating including:
 i. in response to a power generation deficit in the power distribution network, selecting a reduced non-nil electrical consumption level for the individual load among a plurality of possible reduced non-nil electrical consumption levels;
 ii. reducing an RMS voltage of the supply of electrical energy to the individual load to achieve the selected reduced non-nil electrical consumption level while maintaining flicker in the supply of electrical energy to a level acceptable as defined in anyone of International Electrotechnical Standards IEC 61000-3-3, IEC 61000-3-11 and/or IEC 61000-3-12.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of non-limiting examples of implementation of the present invention is provided herein below with reference to the following drawings, in which:

FIG. 16 is an example of a lookup table for looking up delay times and load reduction times for a specific controlled load;

FIG. 17 is an example of a lookup table for looking up the number of cycles to reduce for a specific controlled load;

FIG. 18 is an example of a lookup table for looking up sequences of cycles to reduce for a specific controlled load;

Figure 1:
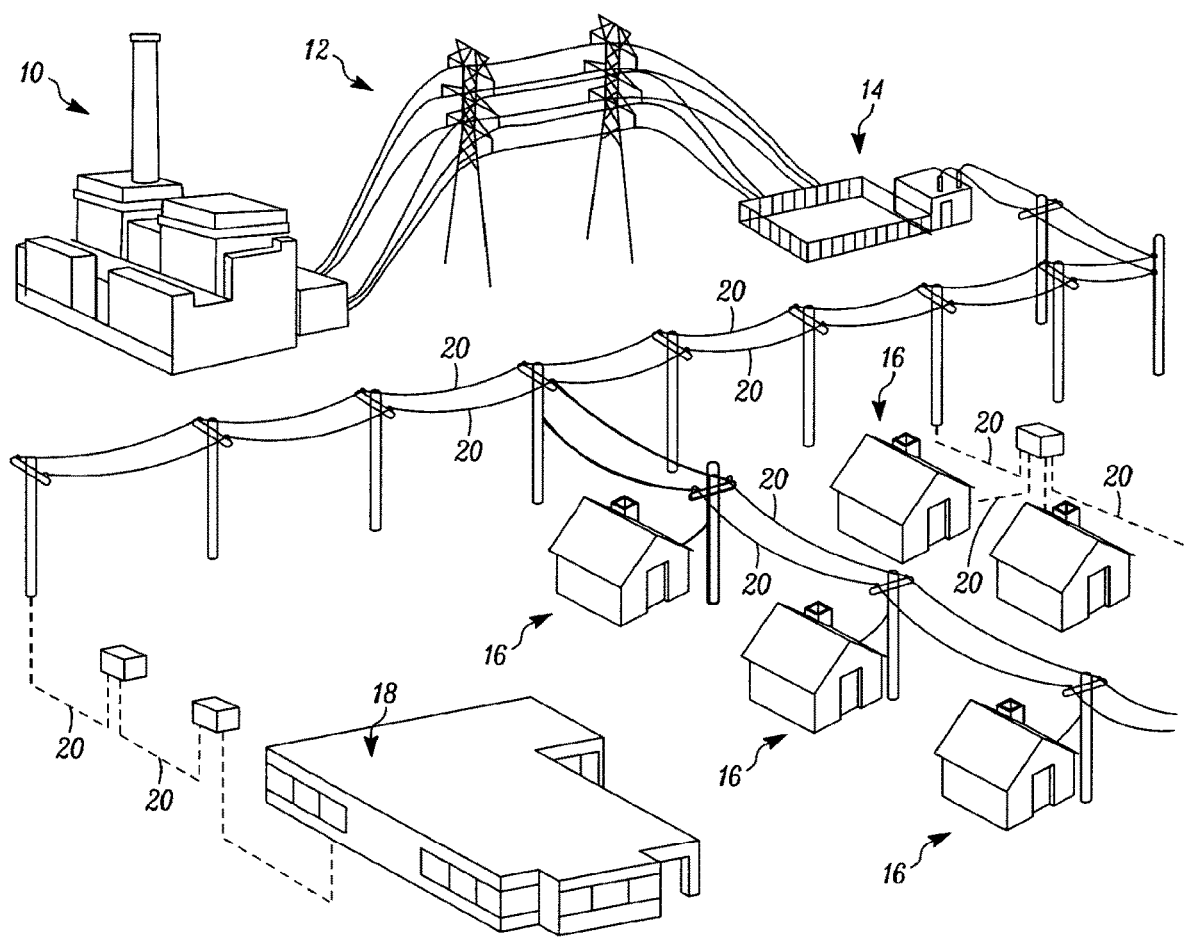
FIG. 1 shows an example of an electrical power grid, illustrating the power generation side and the distributed load side of the power grid.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF THE EMBODIMENTS OF THE INVENTION

To facilitate the description, any reference numeral designating an element in one figure will designate the same element if used in any other figure. In describing the embodiments, specific terminology is used but the invention is not intended to be limited to the specific terms so selected.

FIG. 1 shows an AC power grid. Electricity is generated at a power plant 10 and is transmitted over high-voltage transmission lines 12 to a voltage down step station 14. The voltage down step station 14 lowers the electrical voltage (via transformers for example) such that it may be distributed to households 16 and industrial buildings 18 via residential distribution lines 20.

In a first example of implementation, the present invention provides a power controller 32 that can regulate the amount of electrical energy that household appliances or industrial equipment are allowed to consume. By using a sufficient number of such power control devices, a significant portion of the grid load is controllable and can thus provide a significant effect on the overall power demand.

Figure 2:
FIG. 2 is a bloc diagram of a power-control device in accordance with a non-limiting example of implementation of the invention used to regulate the electrical power that a load is allowed to consume, based on the AC frequency.

FIG. 2 is a diagram of the power controller 32, showing the power controller 32 connected to an AC supply 30 (which is the AC power grid) and to an electrical load 34. The power controller 32 monitors the frequency of the AC supply 30 via the power supply connection to the AC supply. If the frequency varies from its nominal value, the power controller 32 reacts to adjust the electrical consumption of the load 34.

Figure 3:
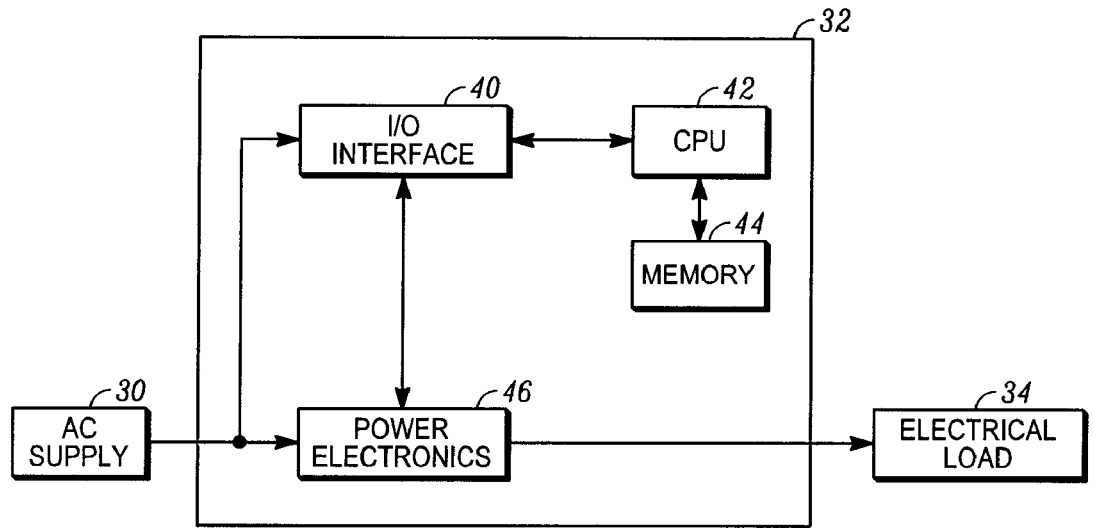
FIG. 3 is a more detailed bloc diagram of the power control device shown in FIG. 2.

With reference to FIG. 3, a more detailed block diagram showing the different components of the power control device of FIG. 2 is shown. The power controller 32 is computer based and uses software to interpret the AC frequency and implement the desired load regulation strategy. The power controller 32 has an input/output interface 40, a CPU 42, a machine-readable storage 44 and power electronics 46. Signals representative of the AC frequency, which are sensed via the power supply connection between the electrical load 34 and the AC supply 30 are communicated to the power controller 32 via the input/output interface 40. The input/output interface 40 reads the frequency information, digitizes it and makes it available to the CPU 42 for processing. Although the term "CPU" is used throughout this document, it is appreciated that any suitable processor for executing logic and/or program code setting out the various functions, procedures and/or methods described in this document may be used. Such examples include a microprocessor, digital signal processors (DSP), application-specific integrated circuit (ASIC), field-programmable gate array (FPGA), etc.

The machine-readable storage (memory) 44 is encoded with software executed by the CPU 42. The software implements the load regulation strategy. The I/O interface 40 outputs control signals that are generated by the software to command power electronics 46 for performing the actual power control. The power electronics 46 typically would include thyristors or power transistors that can lower the RMS (root mean square) voltage and the energy supplied to the electrical load 34. The power electronics 46 can simply chop segments of the voltage wave to effectively lower the RMS supply voltage hence, the amount of power the load consumes. The power electronics 46 would typically include electronic components that can conduct current in either direction (i.e., bidirectional) when triggered (turned on). A TRIAC, also known as a bidirectional triode thyristor or bilateral triode thyristor, is an example of such bidirectional electronic component.

The control signals output from the I/O interface 40 convey information indicating the amount of power reduction desired. In response to these control signals the power electronics 46 control the AC voltage wave accordingly.

Examples of Loads that can be Controlled

The loads that are the most suitable to be controlled, but not restricted to, by the power controller 32 are resistive loads. The power consumed by a resistive load can be adjusted by varying the supply voltage to provide a continuous range of power consumption regulation.

In one specific example of implementation, the electrical load 34 is a water heater in a dwelling. If a decrease in the power consumption of the water heater is necessary, the power electronics 46 will reduce the supply RMS voltage according to the programmed control strategy to obtain the desired power consumption reduction. The decrease in power level can be enforced for a short period of time (for example, ten to thirty minutes) to avoid an excessive cooling of the water load. In this particular example, it is unlikely that the power consumption reduction will affect in a major fashion the functionality of the apparatus and would be almost imperceptible to the end user. The large thermal mass of the water load (assuming that it is at the set point temperature when the load reduction was initiated) may reduce the water temperature by a few degrees and be virtually unnoticeable by the end user. As will be further discussed below, such an effect would be even less perceptible if the power control occurs at times during which the water heater is not being heavily used, such as during the night.

Another example of a load suitable to be controlled is a heating system in a commercial building or a home. In such embodiments, if it is necessary to decrease the power consumption of the load, the power controller 32 can instruct the heating system to reduce the consumed power for a period of thirty minutes, for example. During such a control period, it can be understood that the overall temperature of the commercial building or home may not vary greatly due to the thermal inertia of the building. Hence, such a variation to the end user would once again be small. Note that the heating system may be of resistive nature (electrical heating elements) that can be regulated via the power electronics 46.

Yet another example of a load suitable to be controlled would be an industrial facility implementing a process that requires a significant amount of electrical energy but whose power consumption can be reduced to some degree over a certain period of time without any major drawback on the process itself. An example is an aluminum smelter.

Another example of an apparatus to which a power controller can be connected is an electric oven for food preparation purposes. For example, if the oven is set to operate at a temperature of 450° F., a reduction in power supplied to the oven for a short period of time will not drastically change the temperature of the oven. The oven control can be similar to the heating system control described earlier.

Yet another example of the load that could be controlled by the power controller 32 is a electric clothes dryer. The clothes dryer includes a heating system that can be regulated in a continuous fashion as described earlier. In a period of usage, the power controller 32 can reduce the amount of electrical power made available to the heating system of the dryer. From the point of view of the end-user, this electrical power reduction will translate into a longer drying time.

Electrical Consumption Regulation Strategy

Generally, the electrical consumption regulation strategy has two main phases. The initial phase is a response to an observed frequency decrease. The purpose of this response is to adjust the amount of electrical energy consumed by the electrical load 34. This phase includes determining the degree of electrical energy consumption reduction necessary and the process to implement this reduction. The second phase is the restoration phase. During the restoration phase, the electrical consumption of the load 34 is restored.

Figure 4:
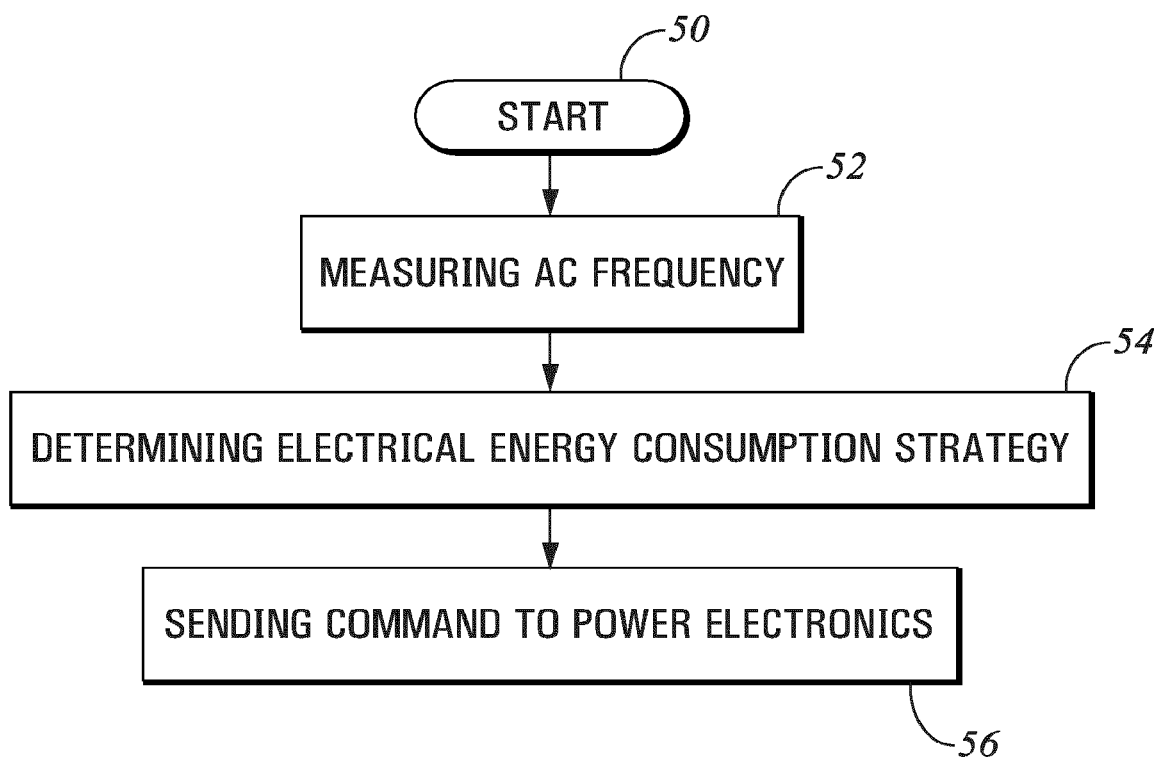
FIG. 4 is a flow chart of the process implemented by the power control device of FIG. 3 for controlling an electrical load.

FIG. 4 is a flow chart of an example of the process implemented by the power controller 32. After the power controller 32 is in an active state (generally represented by a "Start" condition at step 50), the logic of the power controller 32 proceeds to step 52 where the AC frequency is measured to determine if the electrical consumption of the load 34 needs to be adjusted.

Measuring AC Frequency

The purpose of the AC frequency assessment is to detect an imbalance between the generation side of the grid and the load side thereof, which is reflected by the frequency deviation. Typically, the larger the deviation the larger the imbalance. The output of step 52 is thus a frequency value. Since the power controller 32 performs digital data processing, the frequency value is preferably generated in a digital format. Any suitable methodology can be used to convert the AC analog waveform into digital frequency information. A possible refinement is to perform several frequency measurements and to compound those measurements into a single representative value, such as by averaging them. Specifically, the power controller 32 is programmed to acquire over a predetermined period of time a frequency measurement, which is stored in the memory of the power controller 32. In a specific example, a frequency measurement can be made over a 100 ms interval, but this value can vary in various implementations of the invention.

The memory of the power controller 32 keeps a certain number of frequency measurements. As a new measurement becomes available, it is stored in the memory and the oldest measurement is overwritten. All the frequency values that are stored in the memory are averaged as a new frequency measurement becomes available. The average measurement smoothes out short-term frequency variations that may not be indicative of the grid frequency instability.

Note that instead of averaging the frequency measurements, other ways to blend this data into a single representative value is possible.

In addition to computing a frequency measurement, which reflects the current frequency value, step 52 optionally computes the rate of variation of the frequency. The rate of variation of the frequency is an indicator of the AC power grid stability; the faster the frequency diminishes the greater the risk of AC power grid collapse. Accordingly, the rate of variation of the frequency can be used as a factor to tailor the electrical consumption reduction to restore the balance between the generation side and the load side of the AC power grid, or at least prevent further balance deterioration.

Several possibilities exist to determine the rate of frequency variation. One is to measure the rate of frequency variation from the nominal AC power grid frequency versus time. In other words, the process computes the first order derivative of the frequency change versus time. Practically, this measure reflects the speed at which the frequency varies.

Another possibility to determine the rate of frequency variation is to measure the rate at which the rate of variation of the frequency itself varies. This measurement, which is the derivative of the rate of frequency variation versus time, reflects the acceleration of the frequency variation.

The rate of frequency variation versus time is computed on the basis of consecutive frequency measurements stored in the memory and the time intervals separating the frequency measurements. If desired, further computations can then be performed to derive the acceleration of the frequency variation from the speed of frequency variation.

The targeted electrical energy consumption is determined on the basis of several factors, namely the current value of the frequency, the rate at which the frequency varies, the magnitude of the acceleration of the frequency variation or a combination of the aforementioned. Other factors can also be used to further fine-tune the electrical energy consumption regulation.

The '689 application further describes how frequency typically varies in an AC power grid, when a generation unit is lost, and the reader is directed to the '689 application for further information.

The power controller 32 implements decision logic based on the compounded frequency measurement and also the rate of frequency variation in order to determine the electrical energy consumption as represented by step 54. Subsequently, the power controller 32 sends a corresponding command to the power electronics 46 (via control signals, for example) as represented by step 56.

Step 54 of the process thus uses the frequency measurement and optionally the rate of variation of the frequency as an input in determining if an adjustment (i.e., reduction or increase) of the electrical consumption is required. Step 54 may optionally determine the strategy to be employed (when different strategies can be used). In some embodiments, the power controller 32 may be programmed with a specific strategy to be employed and at step 54 after the amount of adjustment of the electrical consumption is determined the adjustment strategy is applied. In instances, when the AC power grid is stable and the frequency is within a nominal acceptable range, the processing at step 54 determines that no electrical consumption adjustment is necessary and no further action takes place. This processing loop constantly repeats to provide a continuous monitoring of the grid frequency stability. As such, when the frequency of the AC power grid is not within a nominal acceptable range, the power controller 32 may regularly determine the electrical consumption level and/or strategy to be employed, based on the frequency instability.

When a large number of power controllers 32 is installed in the electrical network or grid, each of them responds independently to the frequency instability event. Since the responses are coherent and predictable, they all add up to a combined load reduction that has a grid-wide effect.

Determining the Adjustment of Electrical Energy Consumption

Figures 5, 6:
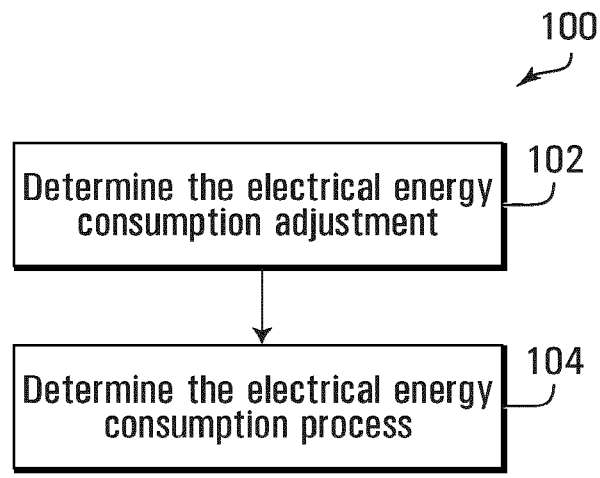
FIG. 5 is a flow chart of the process implemented by the power control device of FIG. 3 for determining the electrical energy consumption adjustment strategy.
FIG. 6 is an example of a lookup table for looking up a controlled load amount based on frequency deviation.

At step 54, in the process of determining the electrical energy consumption adjustment strategy, the first step is to determine the degree of electrical energy consumption adjustment required, as is shown by step 102 in FIG. 5.

In an embodiment, the memory 44 of the power controller 32 stores a table mapping current frequency to respective power consumption values according to a linear relationship. Once the frequency deviation has been computed, the table is selected from the memory 44 and based on the consumption value in the table associated with that frequency deviation, the electrical consumption of the electrical load 34 is adjusted (i.e., increased or reduced) by an amount such that the consumption of the electrical load 34 generally corresponds with the consumption value in the table for the calculated frequency deviation. FIG. 6 illustrates an example table 1000 that shows the value of the controlled load (the percentage of rated value) for various corresponding frequency deviation values. The logic of the power controller 32 based on the determined frequency deviation may use this table 1000 to look-up a corresponding controlled load value. Although table 1000 illustrates in the second column the controlled load (i.e., the percentage of rated value), in other cases the table 1000 may list the percentage of reduction of the load. It is appreciated that the values given in table 1000 are for illustrative purposes only and that other suitable values may be used in various examples of implementation.

Instead of using a table look-up operation, an algorithm or formula can be programmed to compute directly the power consumption of the electrical load 34, based on the frequency deviation.

In other words, the power controller 32 is programmed to compute the power consumption of the electrical load 34, based on the frequency deviation. The programmed response of the power controller 32 to compute the power consumption of the electrical load 34 may be determined in various ways. For example, the power consumption of the electrical load 34 may be determined based on the frequency variation versus time, the magnitude of the acceleration of the frequency variation and/or determined based on any other suitable technique.

The '689 application describes various techniques for the adjustment of the power consumption of the electrical load 34, and the reader is directed to the '689 application for further information.

Figure 9:
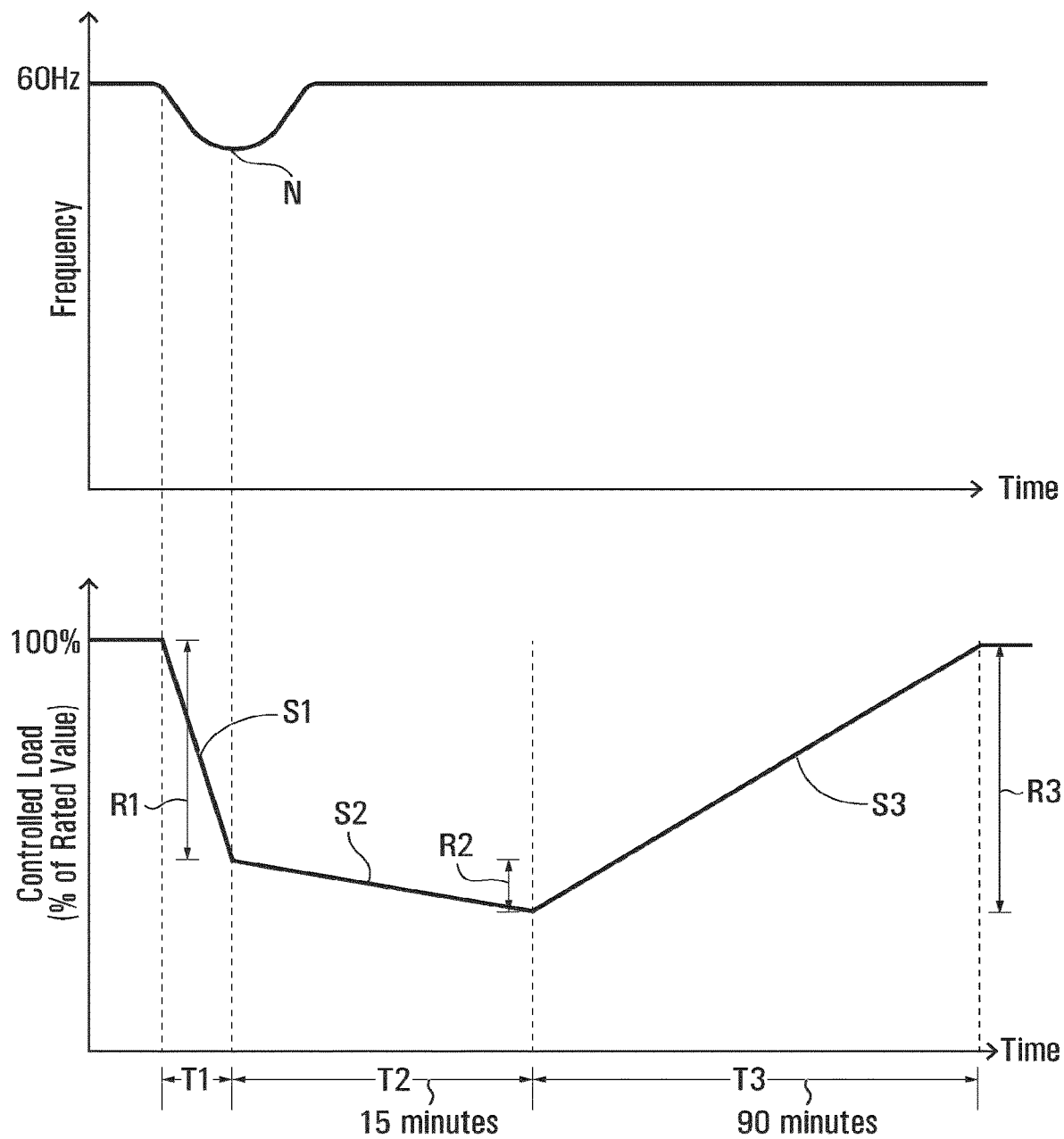
FIG. 9 is an example of a time schedule power adjustment strategy for the power controller.

One technique for adjusting the electrical consumption of the electrical load 34 is based on the magnitude of the frequency imbalance event. FIG. 9 illustrates an example of how the electrical energy consumption of the electrical load 34 may be adjusted in response to an occurrence of a frequency imbalance event. For instance, when the magnitude of the frequency imbalance event (e.g., the magnitude of the current frequency value, the magnitude of the rate of frequency variation versus time, or the magnitude of the acceleration of the frequency variation) is above a threshold, the power control 32 may respond to adjust the load according to the strategy shown in FIG. 9. In other words, based on the determined value of the controlled load (the percentage of rated value) or if the magnitude of the reduction of the controlled load is above a threshold or within a range, a specific response for adjusting the electrical consumption of the electrical load 34 may be used. Different determined value of the controlled load (the percentage of rated value) may have different responses programmed into the memory 44 of the power controller 32. As shown, in response to a frequency imbalance the controlled load is reduced by a first reduction R1, the first reduction R1 in this embodiment is based upon the frequency deviation and is proportional to frequency deviation until the nadir N of the frequency deviation is reached. In other words, the power controller 32 may be designed to continuously or incrementally reduce the controlled load (% of the rated value) until the nadir N of the frequency deviation is reached, at which point the total amount of this reduction is defined by the value R1. The amount of the first reduction R1 may be determined according to the degree of electrical energy consumption adjustment required (e.g., as determined at step 102, as discussed elsewhere in this document). In other words, the reduction R1 may be associated with the value of the controlled load (the percentage of rated value). For example, if it was determined that the electric load 34 should operate at 75% of the rated value at step 102, the reduction R1 could be determined to be a 25% reduction of the rated value. The reduction R1 occurs over a first time period T1—this first time period T1 is typically not programmed into the power controller 32 but is the time that it takes the reduction R1 to occur. After the first reduction R1, the controlled load is then further reduced by a second reduction R2 in the percentage of the rated value in a second specific time period T2 (e.g., 15 minutes). The second specific time period T2 is typically longer in duration than the first time period T1. For example, T1 may be in the order of magnitude of seconds (or less) while T2 may be in the order of magnitude of minutes. The second specific timer period T2 would typically be programmed into the power controller 32. The purpose of the reduction R2 during this second time period T2 is to manage the controlled load (% of rated value) in order to maintain the load, as seen by the generation side, as being generally constant. It has been observed that if the controlled load is maintained constant, the load as seen by the generation side, will not stay constant but would instead creep up. This is a network effect and results from the fact that loads that would normally switch off may have to remain on for a longer period of time since they are operating at a reduced percentage of the rated value. The various loads in the power network are characterized by a collective inertia; for instance, in the case of water heaters, that inertia is of thermal nature owing to the thermal energy stored individually by each water heater. The larger the inertia, the lesser the network effect; in other words, the absolute value of the slope S2 can be lessened while still maintaining the electrical energy consumption at the network level constant. In contrast, the lesser the inertia the larger the network effect, which requires an increased absolute value of the slope S2.

After the second specific time period T2, the controlled load is increased by an increase R3 in a third time period T3 (e.g., 90 minutes), while the power generation supply (e.g., at the power plant 10) is also increased over the third time period T3. The third specific time period T3 is typically longer in duration than the first time period T1 and second time period T2, and may be in the order of magnitude of minutes or hours. The increase R3 takes place during a restoration phase in which the controlled loads in the power network are brought back to 100% of the rated value while the power generation supply is also adjusted to meet the load demands. The value of third time period T3 is chosen to smooth the pick-up demand of the load. The third specific timer period T3 would typically be programmed into the power controller 32. The adjustment time periods T2 and T3 shown are for illustration purposes and the power controller 32 may be designed to have various ranges of time periods for decreasing and then increasing the controlled load.

Each adjustment (e.g., the first reduction R1, the second reduction R2 and the increase R3) is based on a combination or frequency and time parameters. The transition between R1 and R2 is frequency dependent; the R1 phase exists as long as the frequency is decreasing as a result of the unbalance between power generation and load in the power distribution network. The R2 phase is engaged when the frequency has reached the nadir N. The R2 phase is time-dependent and it is maintained over a predetermined time period. In the example shown the time window T2 is of 15 minutes, however other values can be used without departing from the spirit of the invention.

R3 is also time-dependent, although the frequency is monitored to ensure that it remains stable as the load is progressively being brought up. In the example shown the time window T3 is of 90 minutes, however other values can be used without departing from the spirit of the invention.

Since R2 and R3 are determined by the load inertia, the power controller may be programmed with different slopes (or curves) S2 and S3 depending on the particular load that is going to be controlled. For instance, if the power controller will regulate the electrical consumption of a water heater it may be programmed to implement a slope S2 and S3 determined according to the inertia behavior of water heaters. However, when the power controller is designed to control a different load, which has more inertia or less inertia, the value of the slope S2 and S3 would be different.

A specific and non-limiting example will now be discussed where the electric load 34 is a water heater. The water heater typically turns the electric load 34 on or off based on the measured temperature of the water in the tank of the water heater in relation to the set temperature of the water heater. After the water in the tank of the water heater is above the set temperature level, the electric load 34 is switched off. The thermal inertia of the water heater including the rate at which hot water is being discharged from the water heater determines the rate at which the water heater will switch on and off.

The reduction R2 is selected to take into account the effect of water heaters staying at an on state for a longer period of time when the power is reduced by the power controller, decreasing the diversity among several water heaters. Stated otherwise, the reduction R2 takes into consideration the fact that the electrical consumption of the water heater is reduced in response to a frequency imbalance and it would have to remain in the on state for a longer period of time to heat the water back up to the set temperature, as the load is operating at a reduced percentage of the rated value. In other cases, the reduction R2 may also be designed to take into consideration that in the power network at any given time there are a plurality of water heaters where some of the water heaters are on and some are off and that the water heaters may turn on and turn off at various times.

Accordingly, the slope (or curves) S2 and S3 may be based on the type of appliance, and more specifically on the inertia of the appliance, that the power controller manages.

One option is to program the power controller at the manufacturing stage to operate with a predetermined slopes (or curves) S2 or S3 with the understanding that the power controller will be used with the load corresponding to that particular S2 and S3 value. Objectively, this approach creates a logistical burden since the manufacturer may need to produce different types of power controllers to suit the various types of loads that will be controlled. This is less of a problem when the power controller will be integrated into a new appliance; under that scenario, the power controller may be programmed with the particular slopes S2 and S3 as the appliance is assembled. However, in the case of a retrofit, when a power controller is installed to control the electrical consumption of an already existing appliance then the correct power controller needs to be selected with a slopes S2 and S3 that matches the appliance.

Alternatively, the power controller can be provided with an automatic discovery protocol designed to determine the characteristics of the appliance and on the basis of those characteristics it can select a slopes S2 and S3 that matches the appliance. An example of an automatic discovery protocol is an algorithm, which determines, based on the electrical consumption of the appliance what its inertia is. Here, the objective is not to derive a precise value of the inertia; rather it is to identify a category among a number of categories in which the appliance can be placed and on the basis of the selected category to determine the slopes S2 and S3 (different slopes being associated with different categories). A simple example is to provide an algorithm that looks at the frequency at which the appliance switches on and off when there is no under frequency event. The faster the rate, the lesser the inertia of the appliance will be. Note that this approach also takes into consideration how the appliance is being used, in addition to the inherent nature of the appliance. Accordingly, the algorithm can select the slopes S2 and S3 that matches the type of appliance and also the way the appliance is being used (heavy use, light use or medium use).

In view of this technique above, the power controller 32 may be programmed to compute the power consumption of the electrical load 34 (or the adjustment of the power consumption), based on frequency instability (e.g., current frequency value, the rate of frequency variation versus time, the acceleration of the frequency variation) and apply one or more responses to reduce the power consumption of the electrical load 34 followed by a restoration phase.

The Power Reduction Process

Once the amount of adjustment of the electrical consumption by the electrical load 34 is determined (step 102), the next step is to determine a specific electrical consumption process to achieve the desired adjustment of the electrical consumption by the electrical load 34, this is shown by step 104 in FIG. 5.

Figure 7A:
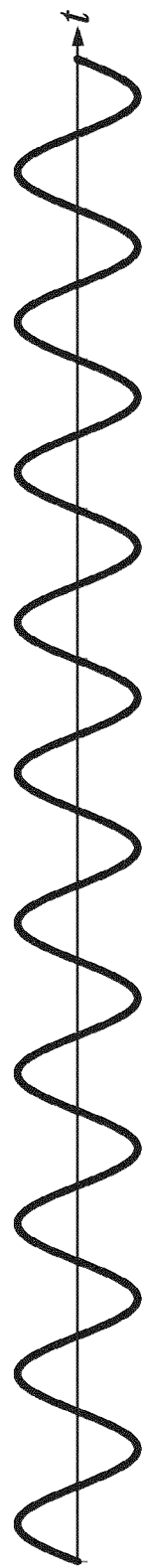
FIGS. 7A and 7B are example voltage waveforms supplied by the power control device to the electrical load.
Figure 7B:
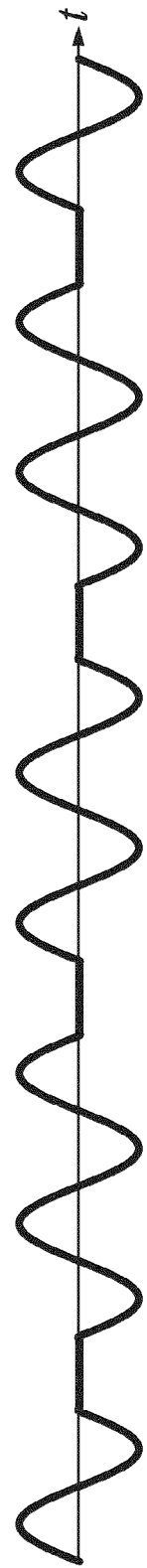

As noted above, the power electronics 46 are configured such that they can lower the RMS voltage supplied to the electrical load 34, which may include the power electronics 46 reducing segments of the voltage wave to zero. FIGS. 7A and 7B illustrate examples of several cycles of voltage waveforms, where the voltage waveform in FIG. 7A does not have any reduction and the voltage waveform in FIG. 7B has several half-cycles reduced to zero volts (0 V). In other words, the voltage waveform in FIG. 7A may be applied to the electric load 34 when it is desirable to operate at 100% of the rated value (i.e., no reduction) and the voltage waveform in FIG. 7B may be applied to the electric load 34 when it is desirable to operate below 100% of the rated value, namely, at 80% of the rated value (i.e., 20% reduction).

Half-cycles of the voltage waveform supplied to the electrical load 34 may be reduced to zero volts (0 V) depending on the desired percentage of the rated value of the electrical load 34. For instance, if one half-cycle is reduced to zero in a two and a half cycle window (i.e., one half-cycle every five half-cycles is reduced to zero), then the electric load would then operate at 80% of the rated value (i.e., 20% reduction)—this is illustrated in FIG. 7B. It should be appreciated that to prevent the creation of a DC component it is desirable to balance the number of positive and negative half-cycles reduced in a given time period. This balancing may be done by reducing positive and negative half-cycles in an alternating manner (e.g., after a positive half-cycle is reduced a negative half-cycle is reduced next and so forth) or by having the same number of positive and negative half-cycles reduced in a given time period. By way of another example, if one half-cycle is reduced to zero in a one cycle window, then the electric load would then operate at 50% of the rated value (i.e., 50% reduction). Similarly, if one half-cycle is reduced to zero in a three cycle window, then the electric load would then operate at 83.33% of the rated value (i.e., 16.66% reduction). In other words, by reducing some half-cycles of the voltage waveform supplied to the electrical load 34 in a specific window (i.e., number of cycles) the percentage of the rated value of the electrical load 34 can be controlled accordingly.

Since the reference point in the waveform for reducing the voltage is a zero crossing, all the power controllers in the power network are effectively synchronized in their operation since the zero crossings occur at the same moment for each power controller. In addition, since the power controllers all read the same frequency, they will typically compute the same degree consumption reduction. Accordingly, the same part of the waveform will typically be chopped-off by each power controller potentially creating unwanted mass effects in the AC power grid.

To overcome this problem, the individual responses of the power control devices can be managed to avoid unwanted distortions. One form of management is to randomize the responses by the power controllers. In other words, the power controllers may be designed such that not all of the power controllers in the network operate exactly in the same way in response to frequency instability events. Optionally, the randomization is determined by taking into consideration three requirements. The first is to maintain a coherent response of the power control devices. In other words, the individual responses should still work cohesively with each other to produce a desired grid-wide effect that compensates the imbalance between power generation and load. Accordingly, the individual responses cannot be dispersed time-wise too much, otherwise the compensation to the imbalance between power generation and load, will be sluggish. The second is to disperse the responses time-wise sufficiently such as to reduce unwanted distortions in the AC power grid. The third is to balance the number of positive and negative half-cycles reduced in a given time period in order to avoid DC component.

Figure 8:
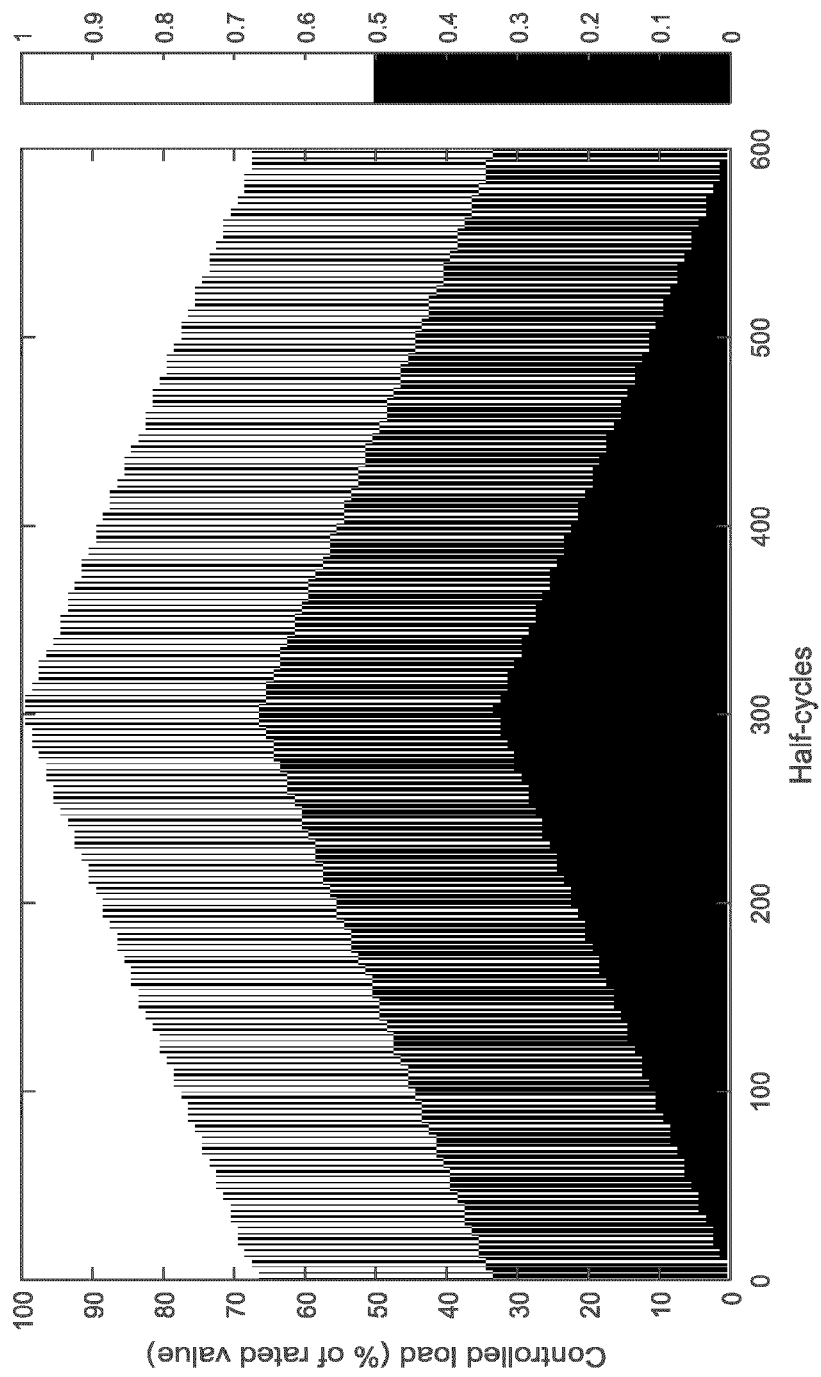
FIG. 8 is an example of a table for a modulation strategy for the power controller.

One strategy for adjusting the electrical consumption is to program the power controller 32 to reduce half-cycles of the voltage waveform according to a modulation strategy. The modulation strategy may be implemented by storing values (e.g., half cycle on or half cycle off) in a look-up table for a specific controlled load (% of the rated value) over a window of time. It should be appreciated that the look-up table may specify which positive and negative half-cycles to reduce. In contrast to the technique discussed above in relation to FIG. 7B, the window time can be increased to a larger period of time (e.g., 600 half-cycles) and a specific half-cycle is removed according to the table indication. This table may specify which positive and negative half-cycles to reduce. FIG. 8 illustrates a graph based on the determined controlled load (% of the rated value) indicating for each half cycle in the window whether they are on or off. As shown, the black-colored sections of the table indicate that a half-cycle is off while a white-colored section indicates that a half-cycle is on.

The power controller 32 counts the half-cycles of the voltage waveform, such that the voltage waveform that is applied to the load is modified according to FIG. 8. The counter may be in the form of an index which is incremented each half cycle. Based on the index a particular half cycle and also based on the percentage of the controlled load the power controller 32 can determine whether that particular half cycle is on or is off. Once the half cycle count reaches the end of the time window, in this case reaches the 600 value, then the FIG. 8 is repeated from the start. In other words, the half cycle index is reset to 0 and the operation starts again.

Note that the index may not necessarily start at the 0 mark. The table of FIG. 8 can be entered at any index value and the operation started at that point. The selection of the entry point can be made by using some sort of a random or pseudo-random number generator. In this fashion, a degree of randomization can be achieved for each power controller 32 such as to avoid the same half-cycles being on or off at the same time. This characteristic is described in greater detail below.

It is appreciated that the modulation strategy may be applied to the AC voltage waveform to reduce the RMS value of the AC voltage waveform such that the desired adjustment of controlled load (% of the rated value) as determined in step 102 is achieved. The modulation strategy may be stored in a look-up table for various values of the amount of the controlled load (% of the rated value). The modulation strategy may be stored as a formula or algorithm. The modulation strategy may include reducing various half-cycles of the AC voltage waveform in a specific number of half-cycles based on the desired reduction of the controlled load (% of the rated value).

Additionally, the modulation strategy in the graph of FIG. 8 may be used with the response strategy shown in FIG. 9. In such case, based on a frequency instability event the power controller 32 may first determine the amount of frequency instability (step 52) and then responds according to the amount of frequency instability. The one or more reductions for adjusting the electrical energy consumption may depend on the magnitude of the frequency instability. As such, the power controller 32 may be programmed with various responses that may be used depending on the magnitude of the measured frequency instability. After the occurrence of the frequency instability event, the adjustment of the amount of controlled load (% of rated value) may follow one or more reductions (e.g., as shown in FIG. 9), where the strategy for reducing the controlled load (% of the rated value) may be done according to the modulation strategy to achieve the desired reduction in the controlled load (% of the rated value). For instance, as the reductions in FIG. 9 are applied, the modulation strategy to achieve the desired value of the controlled load (% of the rated value) is obtained from the table in FIG. 8, or similar. One technique to randomize the electrical energy consumption adjustment when there is a plurality of power controllers in the power network is that the plurality of power controllers may be programmed with non-identical responses. In other words, the plurality of power controllers may have modulation strategy tables of the type shown in table in FIG. 8 for adjusting the controlled load but where at least some of the power controllers have modulation strategy tables that differ from one another. Another technique to randomize the electrical energy consumption adjustment is to start the modulation strategy in table of FIG. 8 at a random start point in response to a frequency instability event. The random start point of the modulation strategy may be accomplished by a random number generator that determines the start point (e.g., a random number generator between 1 and 600 and the modulation strategy in FIG. 8 starts at the half-cycle corresponding to the randomly generated number). Alternatively, the power controller 32 may be programmed with a quasi-random number (i.e., a seed or start index value) that the counter will start its count in response to a frequency instability event, and when there is a plurality of power controllers in the network at least some of them have different quasi-random numbers.

It is appreciated that the modulation strategies to reduce half-cycles of the voltage waveform applied to the load 34 may be designed in various ways. As discussed above, the modulation strategy among a plurality of power controllers may be designed to have some variance in the modulation strategy employed among the plurality of power controllers (e.g., non-identical responses) in order to introduce some form of randomness in the power adjustment process, keeping in mind that the overall load as seen by the grid should follow the electrical energy consumption target. The modulation strategy may also be designed to take into account flicker.

When the power controller 32 makes adjustments to electrical load 34, this causes voltage fluctuations, those voltage fluctuations affect the controlled load and also electrical equipment which is connected to the same power supply as the controlled load. Since the controlled load tends to draw large amperage, when a half cycle is cut off the voltage of the power supply (the power distribution panel in a dwelling for example) slightly increases. Those voltage fluctuations are usually referred to as "flicker". When lights in the dwelling are supplied by voltage which carries some degree of "flicker", an undesirable visual effect can ensue. In general, visual flicker is a visible change in brightness of a lamp typically due to rapid fluctuations in the voltage of the power supply powering the lamp. The term "lamp" is used to refer to any device that may present some form of visible light, such as lighting sources. Flicker may be caused by load fluctuations of a device near the flickering device (e.g., the power controller 32 in a dwelling may cause flicker on lamps in the dwelling). It is desirable to have the power controller 32 operate such that any voltage fluctuations caused by the power controller 32 are within an acceptable level such that there is no visible or limited flicker and/or any flickering is within an acceptable level. Limits on flicker and harmonics are discussed in the International Electrotechnical Commission standards IEC 61000-3-3, IEC 61000-3-11 and IEC 61000-3-12, the contents of which are herein incorporated by reference. The power controller 32 may be designed to meet the limits on flicker and harmonics as discussed in the IEC 61000-3-3, IEC 61000-3-11 and IEC 61000-3-12 standards. In general flicker may be measured by perception of light flicker in the long term ($P_{lt}$) which is usually defined as a 2-hour interval or by perception of light flicker in the short term ($P_{st}$) which is usually defined as a 10-minute interval. Flicker may be measured with commercially available flicker meters, which return a $P_{st}$ and/or $P_{lt}$ level. More specifically, $P_{st}$ may be calculated according to a statistical process over a standardized 10-minute observation interval and $P_{lt}$ may be calculated as the cubic average of several $P_{st}$ values over a standardized two-hour period. For example, a limiting value for $P_{st}$ may be 1.0 and a limiting value for $P_{lt}$ may be 0.65, as specified in the standards It should be noted that flicker is not merely a local phenomenon, in other words it does not only affect the loads that connect to the same power distribution panel in a dwelling. The undesirable phenomena of synchronization between multiple power controllers 32, each operating in a respective dwelling, may have an aggregate effect that can produce additional flicker phenomena at the network level. More generally flicker may occur such that there is:
 (i) local flicker to other devices on adjacent circuits such as circuits connected to the same power supply;
 (ii) flicker at the low voltage transformer of the network which feeds multiple dwellings; and
 (iii) flicker at the medium voltage transformer.

Although in the latter two cases there typically would not be any lamp-based devices directly connected to the low voltage transformer or the medium voltage transformer, voltage fluctuations present at these locations may propagate through the power network to the devices indirectly connected thereto.

To avoid flicker at the local level, the power controller 32 could be designed such that its electrical energy consumption adjustment strategy and/or modulation strategy would not cause any visible flicker to local devices or flicker below a specific threshold. For example, if the power controller 32 is connected in a residential dwelling to a water heater, the power controller 32 could be designed such that the electrical energy consumption adjustment strategy does not cause any flicker to lamps within the dwelling or is within an acceptable limit. In other words, the voltage fluctuations caused by the power controller 32 could be designed such that local flicker is below a specific threshold. The threshold level of flicker that the power controller 32 is designed to achieve may be a $P_{st}$ value of 1.0 or less and/or a $P_{lt}$ value of 0.65 or less. Tests conducted by the present inventors have determined that when the power controller 32 is operated according to a schedule similar to FIG. 8, in terms of which half cycles are on and which half cycles are off, visual flicker is maintained within the acceptable level, as defined by the aforementioned International Electrotechnical Standards IEC 61000-3-3, IEC 61000-3-11 and/or IEC 61000-3-12. It is appreciated that when the power controller 32 is operated according to the schedule in FIG. 8, in terms of which half cycles are on and which half cycles are off, and additional loads are placed on the power network, that the schedule in FIG. 8 may also assist in maintaining visual flicker within the acceptable level (e.g., $P_{st}$ value of 1.0 or less and/or a $P_{lt}$ value of 0.65 or less).

Figure 10:
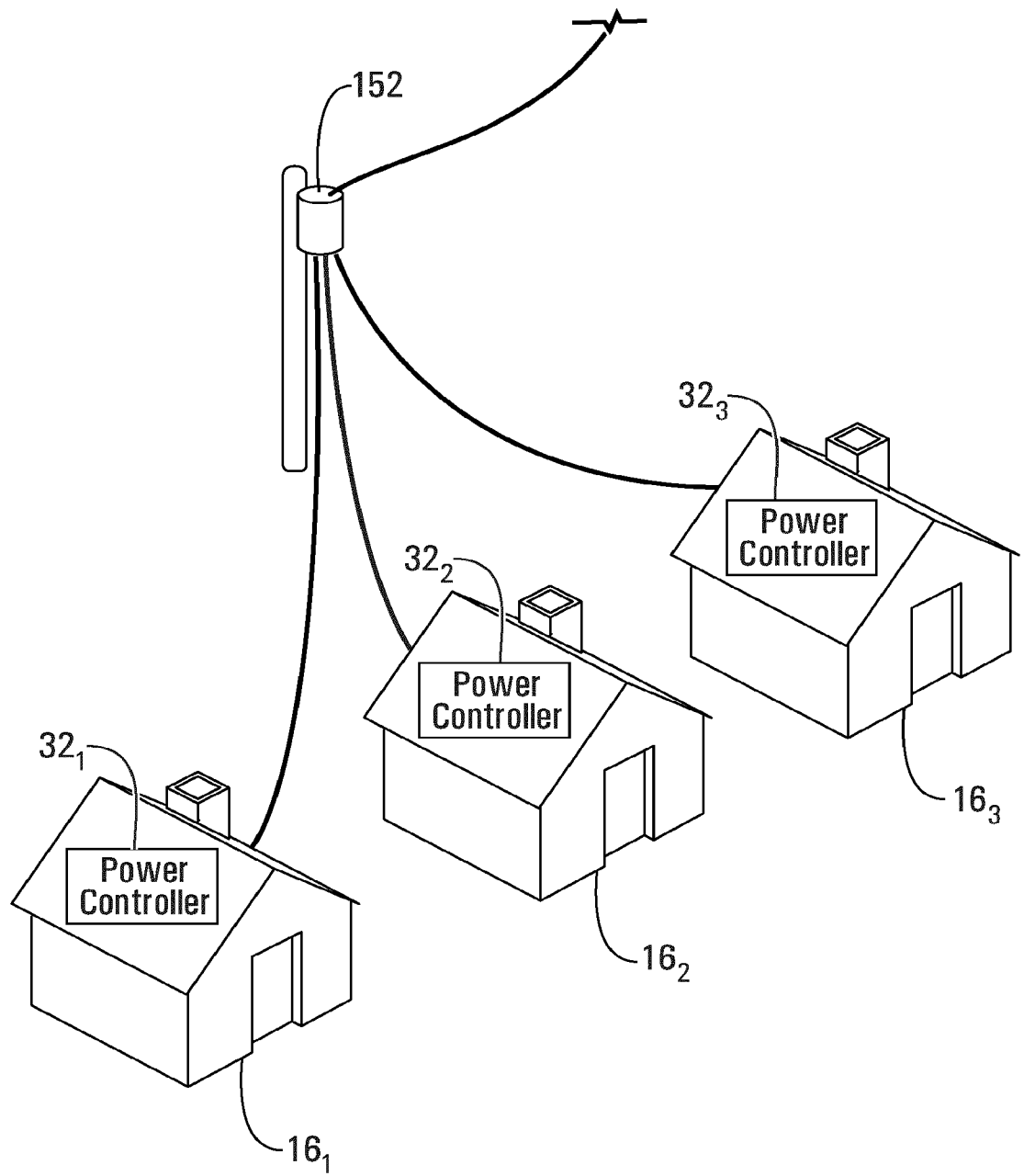
FIG. 10 is an example of a low voltage transformer connected to a plurality of power controllers of the type illustrated in FIG. 3.

To avoid flicker at the low voltage transformer, the power controller 32 could be designed such that the electrical energy consumption adjustment strategy and/or modulation strategy would not cause any visible flicker or flicker below a specific threshold to devices receiving power via the low voltage transformer. FIG. 10 illustrates an example of a low voltage transformer 152 supplying power to three houses $16_1$ $16_2$ $16_3$ each having respective power controllers $32_1$ $32_2$ $32_3$. The electrical energy consumption adjustment strategy and/or modulation strategy of the power controllers $32_1$ $32_2$ $32_3$ could be designed such that each of the power controllers $32_1$ $32_2$ $32_3$ in response to a frequency instability event operate in a manner such that visible flicker or flicker is below a specific threshold for devices receiving power via the low voltage transformer 152 (e.g., any lamps in any of the houses $16_1$ $16_2$ $16_3$). More specifically, this may be achieve by designing each of the plurality of power controllers $32_1$ $32_2$ $32_3$ with non-identical responses. For example, the first power controller $32_1$ may have a first response scheme, the second power controller $32_2$ may have a second response scheme and the third power controller $32_3$ may have a third response scheme. Then, in response to a frequency instability event all three of the power controllers $32_1$ $32_2$ $32_3$ would respectively determine the amount of electrical energy reduction and all three of the power controllers $32_1$ $32_2$ $32_3$ would then respectively apply their respective response schemes. These three response schemes may be according to the examples shown in FIGS. 8 and 9. Each of these schemes are designed such the power controllers $32_1$ $32_2$ $32_3$ operate in a manner such that any devices that are supplied power via the low voltage transformer 152 do not have any visible flicker or have flicker that is below a specific threshold. The threshold level of flicker that the power controllers $32_1$ $32_2$ $32_3$ are designed to achieve may be a $P_{st}$ value of 1.0 or less and/or a $P_{lt}$ value of 0.65 or less.

Figure 12:
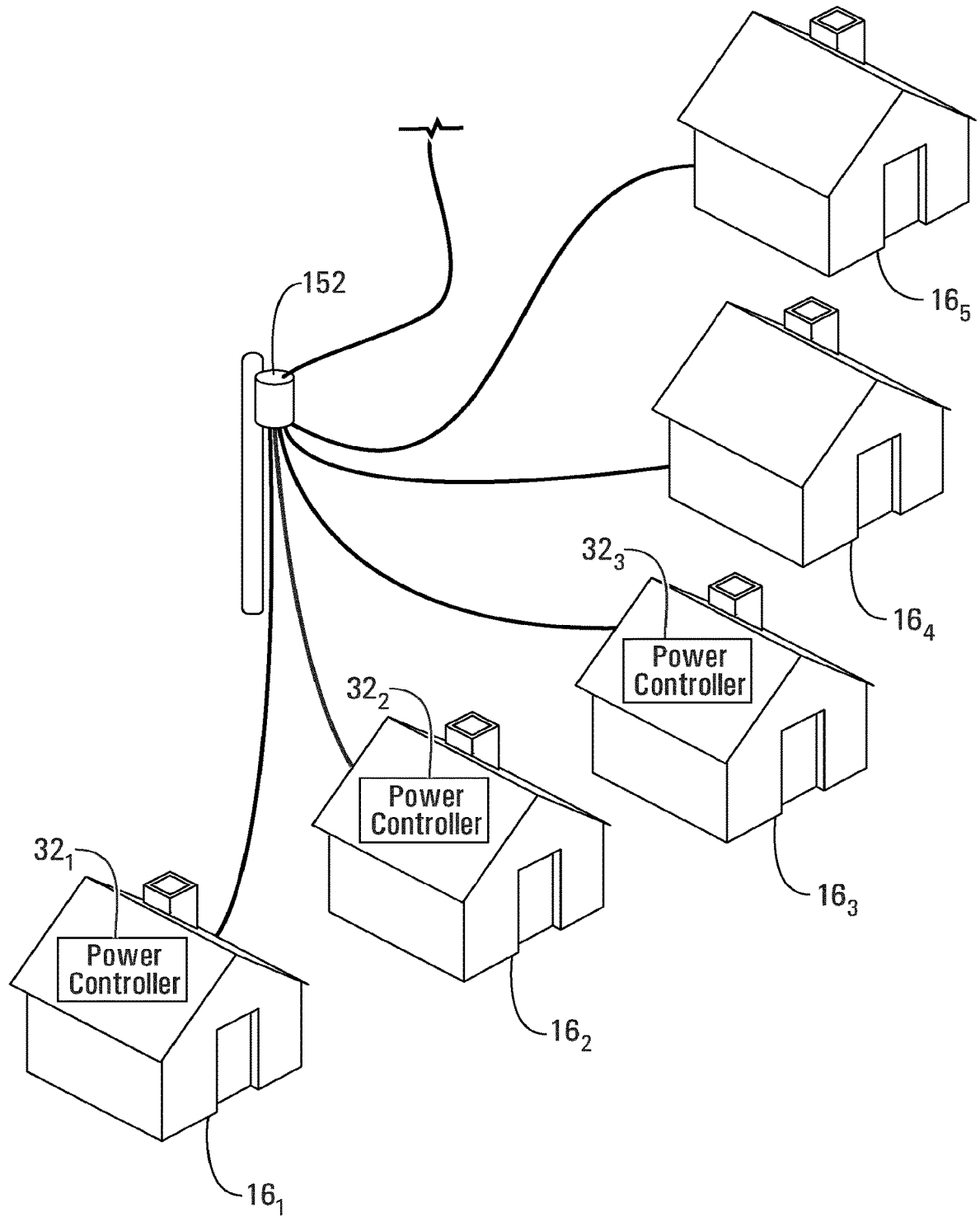
FIG. 12 is an example of a low voltage transformer supplying power to a plurality of dwellings where the low voltage transformer is respectively connect to a plurality of power controllers associated with a select number of the dwellings.

Turning now to FIG. 12, illustrates an example of a low voltage transformer 152 supplying power to five houses $16_1$ $16_2$ $16_3$ $16_4$ $16_5$ where the first three house $16_1$ $16_2$ $16_3$ each have a respective power controller $32_1$ $32_2$ $32_3$. In this example, the fourth and fifth house $16_4$ $16_5$ both do not have a power controller. The electrical energy consumption adjustment performed by the power controllers $32_1$ $32_2$ $32_3$ is designed such that each of the power controllers $32_1$ $32_2$ $32_3$ in response to a frequency instability event operate in a manner such that their responses are not synchronous, thus keeping flicker below a specific threshold for all devices receiving power via the low voltage transformer 152 (e.g., any lamps in any of the houses $16_1$ $16_2$ $16_3$ $16_4$ $16_5$). In other words, by having the response schemes of the power controller $32_1$ $32_2$ $32_3$ being according to the examples shown in FIGS. 8 and 9 it may be possible to achieve flicker below a specific threshold for all dwellings (e.g., the houses $16_1$ $16_2$ $16_3$ $16_4$ $16_5$) that receive power via the low voltage transformer 152. As discussed elsewhere, the desynchronization of the various power controllers is achieved according to the scheme at FIG. 8, however each power controller has a different entry point in the scheme.

Figure 11:
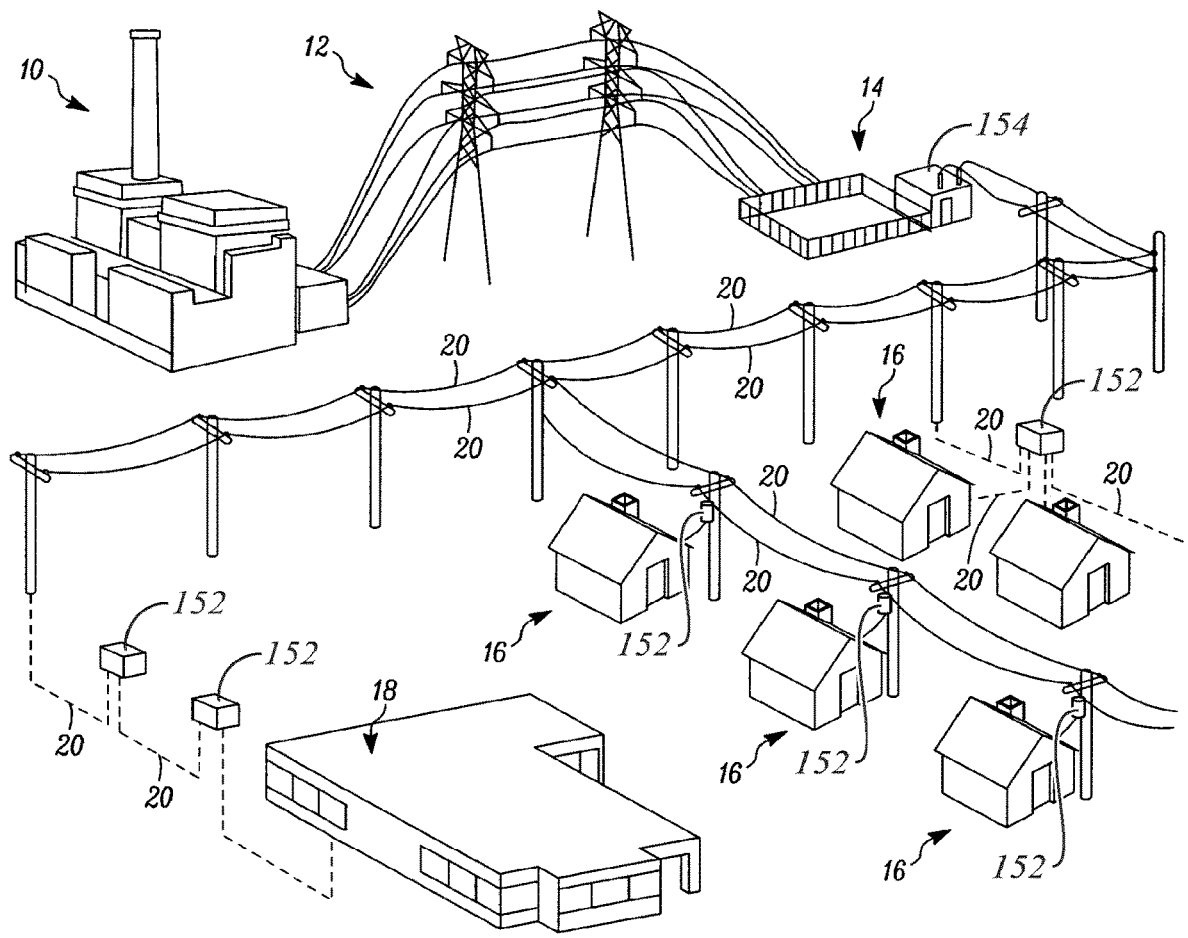
FIG. 11 is an example of a medium voltage transformer connected to a low voltage transformer

To avoid flicker at the medium voltage transformer, the power controller 32 could be designed such that the electrical energy consumption adjustment strategy and/or modulation strategy would not cause any flicker or flicker below a specific threshold to devices receiving power via the medium voltage transformer via low voltage transformers. FIG. 11 illustrates an example of a voltage down step station 14 that includes a medium voltage transformer 154. The medium voltage transformer 154 lowers the electrical voltage from the power plant 10 and is connected to a plurality of low voltage transformers 152 that supply power to dwellings 16 or commercial buildings 18. Similar to the example of the design of the power controllers $32_1$ $32_2$ $32_3$ connected to the low voltage transformers 152 in order to meet a specific flicker requirement, the design of the plurality of power controllers that are in the power network that are supplied power by the medium voltage transformer 154 may be designed such that electrical energy consumption adjustment strategy and/or modulation strategy of these plurality of power controllers would not have any visible flicker or have flicker that is below a specific threshold for lamp-based devices supplied power via the medium voltage transformer 154. This may be achieved by designing the schemes of the plurality of power controllers in the network such that some of the power controllers have non-identical response such that the plurality of power controllers collectively achieve the flicker threshold for devices receiving power via the medium voltage transformer 154. As shown in the example of FIG. 12, in the plurality of houses $16_1$ $16_2$ $16_3$ $16_4$ $16_5$ only some of the house ($16_1$ $16_2$ $16_3$) have power controllers ($32_1$ $32_2$ $32_3$) and similar to the example of the low voltage transformer 152 (discussed above) the response schemes of the power controller $32_1$ $32_2$ $32_3$ may being according to the examples shown in FIGS. 8 and 9 such that it may be possible to achieve flicker below a specific threshold for all dwellings (e.g., the houses $16_1$ $16_2$ $16_3$ $16_4$ $16_5$) that receive power via the medium voltage transformer 154.

It should be appreciated that if the power controllers $32_1$ $32_2$ $32_3$ each have the table of FIG. 8 and enter the table of FIG. 8 (or similar) at different entry points, in response to a frequency imbalance event, that this may assist in minimizing flicker and meeting the flicker desired limits as discussed above (e.g., $P_{st}$ value of 1.0 or less and/or a $P_{lt}$ value of 0.65) and/or the limits in the International Electrotechnical Standards IEC 61000-3-3, IEC 61000-3-11 and/or IEC 61000-3-12.

Although in the examples above the modulation strategy reduces half-cycles, in other embodiments the modulation strategy could include reducing full-cycles.

In theory, the voltage waveform applied to the electric load 34 may be reduced in various ways, other than reducing half-cycle of the voltage waveform. However, the practical reality is that reducing only partial half-cycles may introduce undesirable harmonics. Although it is preferred to reduce the voltage waveform applied to the electric load 34 by reducing half-cycles, some other possible techniques are as follow:

(i) Random Cycle Delay

Figure 13:
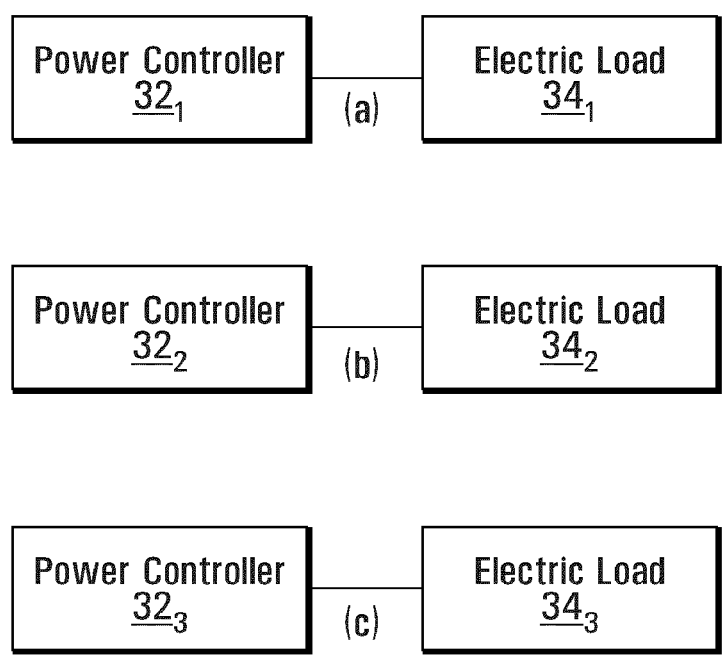
FIG. 13 is an example of a set of the power control devices of the type illustrated in FIG. 3.

FIG. 13 illustrates a specific and non-limiting example where the AC power grid has three power controllers $32_1$ $32_2$ $32_3$ and three electrical loads $34_1$ $34_2$ $34_3$, respectively. It is appreciated that the number of electrical loads illustrated in this example is for illustration purposes only and the number and type of loads on the power network may vary. In the subsequent examples, the reference (a) is used to refer to the voltage wave form supplied from the first power controller $32_1$ to the first electric load $34_1$, the reference (b) is used to refer to the voltage wave form supplied from the second power controller $32_2$ to the second electric load $34_2$ and reference (c) is used to refer to the voltage wave form supplied from the third power controller $32_3$ to the third electric load $34_3$.

An example of adjusting the voltage waveform is the introduction of a random cycle delay in the response of each power controller $32_i$. In this case, after the degree of electrical consumption reduction is determined (step 102), then the power reduction strategy (step 104) includes determining a delay and waiting for the duration of the delay period prior to initiating the response. The delay may be an integer based delay corresponding with a number of cycles (e.g., X full cycle delay; where X is a non-negative integer, such as 0, 1, 2, . . . ). An upper limit may be set for the maximum number of cycles to delay. For example, it may be desirable for all of the power controllers $32_1$ $32_2$ $32_3$ in the set to initiate load reduction within a window or a certain number of cycles or seconds (e.g., 60 cycles or 1 seconds). In other cases, the delay may be a time period which does not necessarily correspond to a full number of cycles.

Figure 14:
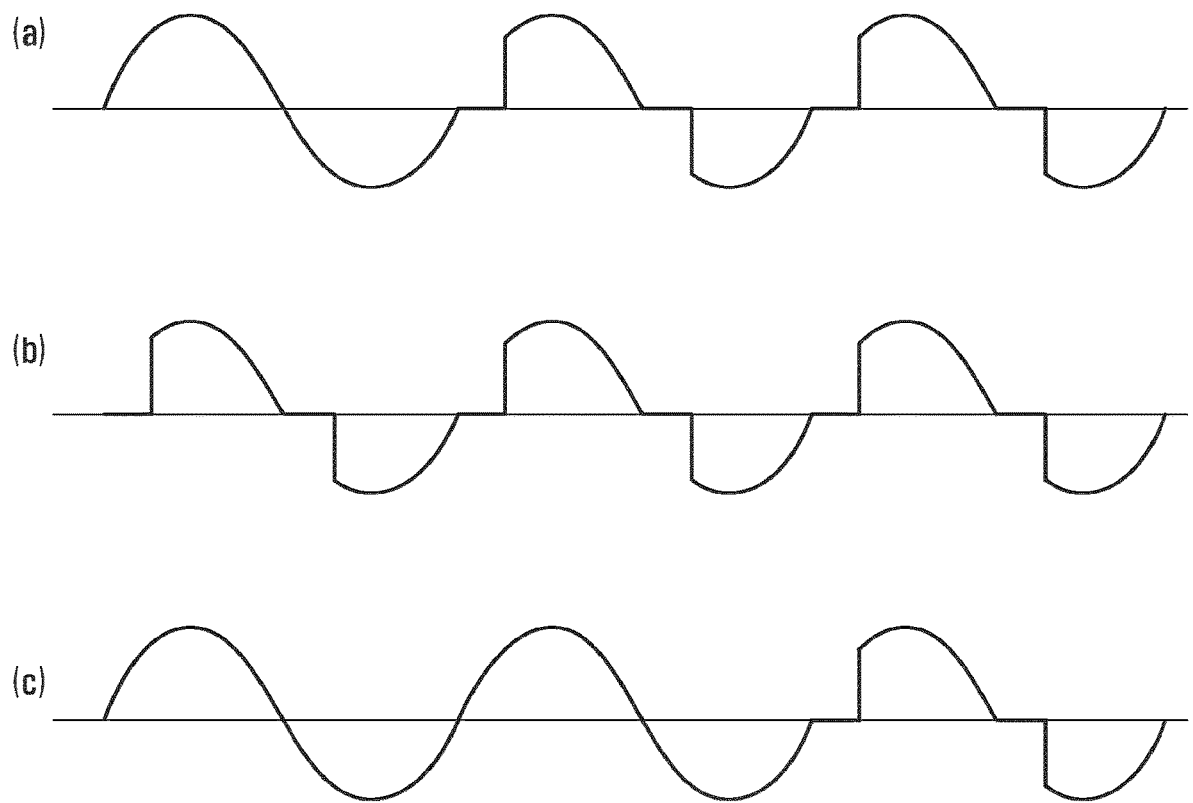
FIG. 14 illustrates examples of voltage waveforms supplied by the set power control devices of FIG. 13 to electric loads.

FIG. 14 illustrates an example of the three voltage wave forms (a) (b) (c) applied to the respective electrical loads $34_1$ $34_2$ $34_3$. In this example the delay of the first power controller $32_1$ is 1 cycle, the delay of the second power controller $32_2$ is 0 cycles and the delay of the third power controller $32_3$ is 2 cycles. Since the various power controllers $32_1$ $32_2$ $32_3$ initiate their response at different times, this approach may reduce unwanted distortions on the power grid.

The delay may be determined by a random number generator. The CPU 42 may execute instructions stored on the memory 44 of the power controller 32 to randomly generate a non-negative integer. The random number generator may be based on a seed value or maybe a quasi-random number generator. In other cases, the delay may be preset in each power controller $32_1$ $32_2$ $32_3$. In other words, each of the power controller $32_1$ $32_2$ $32_3$ is preset at the time of manufacturing or prior to the installation with a static delay that varies among the set of power controllers $32_1$ $32_2$ $32_3$. In yet other cases, each of the power controllers $32_1$ $32_2$ $32_3$ is preset at the time of manufacturing or prior to the installation with a static seed value that varies among the set of power controllers $32_1$ $32_2$ $32_3$ and the seed value of each of the power controller $32_1$ $32_2$ $32_3$ is used by the random number generator to then generate a quasi-random delay number.

(ii) Random Offset

Another example is the introduction of a random offset. To introduce the random offset, a delay time (dt) and a load reduction time (lrt) are determined. The determination of the delay time (dt) and the load reduction time (lrt) are associated with the determined amount of reduction of the electrical consumption (from step 102), as the determined amount of reduction of the electrical consumption may place a limit of a suitable value for the delay time (dt) and determined load reduction time is dependent on the determined value of (dt) along with the determined amount of load reduction.

Figure 15A:
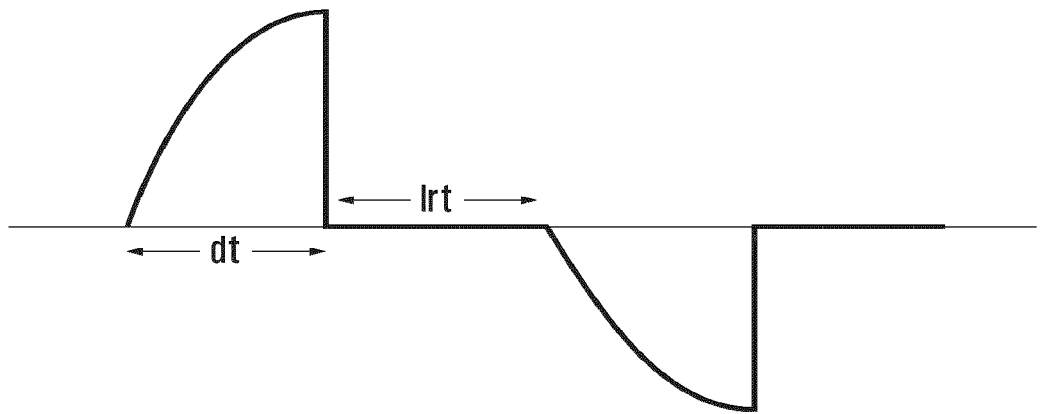
FIGS. 15A and 15B are example voltage waveforms supplied by the power control device to the electrical load.
Figure 15B:
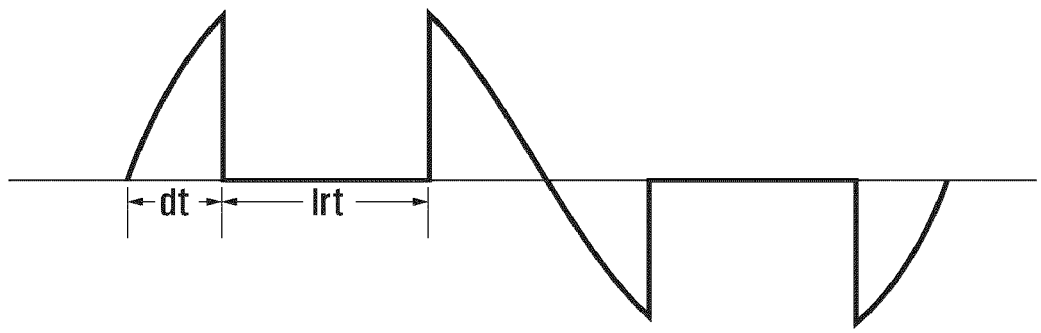

FIGS. 15A and 15B illustrate examples of voltage waveforms applied to the electrical load 34 based on determining the amount of reduction of the electrical consumption and then determining the delay time (dt) and the load reduction time (lrt) to achieve the determined amount of reduction of the electrical consumption. The delay time (dt) may be a randomly generated number in the interval of 0 to 0.5*C/f, where f is the fixed frequency (usually 50 or 60 Hz) and C is the percentage rated value (in the decimal number equivalent in the range of 0 to 1) of the controlled load as determined in step 102. Once the delay time (dt) is determined, a load reduction time (lrt) may be determined based on the delay time (dt), where the load reduction time (lrt) starts after the delay time (dt) and is the duration of time where the load is reduced to zero. The determination of the load reduction time (lrt) may be based on computing a mathematical formula (e.g., based on the area under the voltage curve) or using the determined delay time (dt) to look-up the load reduction time (lrt) in a lookup, such as the table shown in FIG. 16.

By way of a specific and non-limiting example, if it is determined that the frequency rate of variation is –0.25 Hz/s then the power controller 32 may then use a look-up table and determine that the reduction of the electrical consumption should be 50%. Based on this desired amount of reduction of the electrical consumption a delay time (dt) can be determined, a random number generator may be used to generate the delay time (dt) where the output parameters of the random number generator are configured to be between 0 and 0.25 of the cycle. Then the random number is generated and in this case equals to 0.25 of the cycle (e.g., 4.166 ms, assuming a 60 Hz waveform). The load reduction time (lrt) is determined and in this case is done by looking-up the load reduction time (lrt) based on the delay time (dt) in a lookup table (e.g., see FIG. 16). The power controller 32 then steps in via the power electronics 46 to reduce the electrical load 34 according to the determined amount of reduction of the electrical consumption as shown in FIG. 15A. Although not illustrated, the power controller 32 may continue to implement the reduction of the electrical consumption as shown in FIG. 15A for multiple cycles until a new frequency rate of variation is determined and the process 100 is repeated for the new frequency rate of variation.

The lookup table may include a series of lookup tables for a series of different controlled load values. As shown in FIG. 16, a lookup table for a series of different delay times and load reduction times is provided for a controlled load of 50%. Once the amount of reduction of electrical energy is determined, the appropriate controlled load table may then be used to randomly select an entry in the table to obtain the delay time (dt) and load reduction time (lrt).

Alternatively a load conduction time may be determined instead of a load reduction time (lrt), where the load conduction time is the time the load is conducting and is associated with the delay time (dt) and the determined amount of reduction of electrical energy consumption (from step 102) and is determined in a similar manner to that of the load reduction time (lrt).

(iii) Random Reduction of Full Cycles

Another example is to determine a number of full (or half-cycles, as discussed elsewhere in this document) to reduce in a window and reduce a random set of cycles in the window that correspond to the determined number of cycles to be reduced. The window size may vary depending on implementation. By way of example, a suitable window time may be anywhere in the range of 0.1 to 10 seconds.

Figure 19:
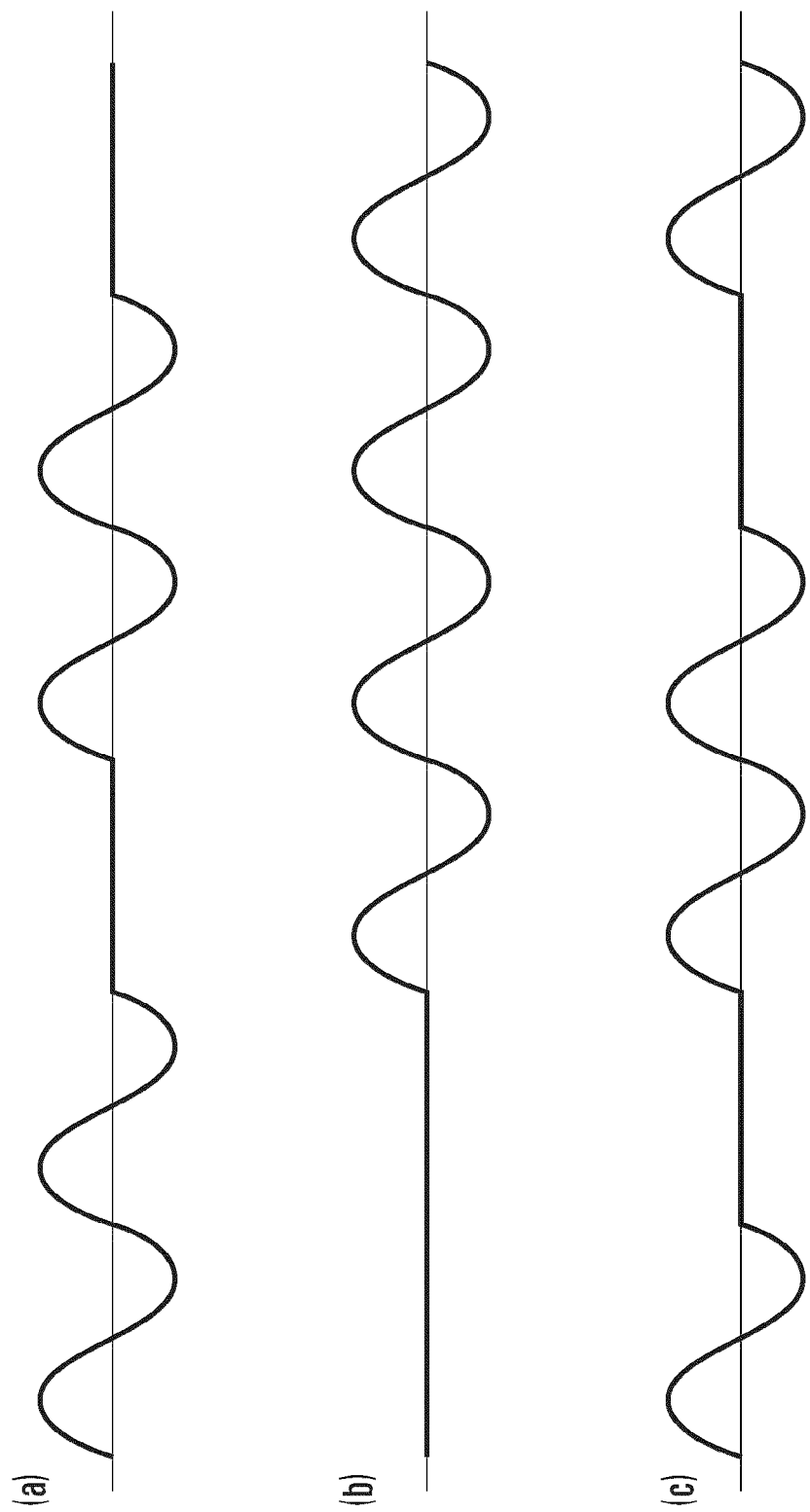
FIG. 19 illustrates examples of voltage waveforms supplied by the set power control devices of FIG. 16 to electric loads.

FIG. 19 illustrates the first 6 cycles of a set of voltage waveforms for the set of power controllers $32_1$ $32_2$ $32_3$. As shown, each power controller $32_i$ in the set of power controllers $32_1$ $32_2$ $32_3$ generates a set of cycles in a window time. In this example, there are 6 cycles illustrated, and as such the window time is 6 cycles. Also, in this example it is assumed that the determined amount of electrical consumption reduction results in a controlled load of 66.67% of the rated value. Each of the power controllers $32_1$ $32_2$ $32_3$ determines that 2 of the 6 cycles in the window should be reduced based on this load reduction and then determines a random set of cycles that should be reduced to achieve this desired controlled load. As shown, power controller $32_1$ determines that cycles 2 and 6 should be reduced, power controller $32_2$ determines that cycles 1 and 2 should be reduced and power controller $32_1$ determines that cycles 2 and 5 should be reduced.

The power reduction process can also be implemented as follows. After the degree of electrical consumption reduction is determined (step 102), the electrical consumption process (step 104) includes first determining the number of cycles to be reduced. As shown in FIG. 17, a lookup table may be used to determine the number of cycles to be reduced. In the example given in FIG. 17, the process operates on a 1 second window. A random number generator may be used to determine which cycles in the window should be reduced. For example, in a 1 second window there are 60 cycles (assuming a 60 Hz signal), and if it is determined that the electrical consumption should be reduced by 50% then 30 of the 60 cycles should be reduced and the random number generator would generate a set of 30 unique numbers in the range of 1 to 60 and then the cycles corresponding to the generated set of 30 unique numbers would then be reduced. Alternatively, a binary number generator may be used to generate an ordered sequence of binary numbers (i.e., 0 or 1) that correspond in length with the number of cycles in the window and where the distribution of the sequence has a set number of 0's that correspond with the number of cycles to be reduced. The ordered sequence of binary numbers can then be correlated against the cycles in the window.

For each subsequent 1 second window, the process is repeated. One option is to keep reducing the same cycles determined previously. Alternatively, the cycles to be reduced are recomputed at each window.

(iv) Random Reduction of Full Cycles Based on Predefined Sequences

A further example, which is similar to the example above, is provided for an electrical consumption reduction process. In this case, instead of using the random number generator for determining which cycles to reduce, a lookup table is provided which includes a set of predetermined cycles to reduce. Then a random number generator is used to determine which entry of the table to use. FIG. 18 illustrates an example of a lookup table that may be used based on the determined amount of electrical consumption reduction and window time. A random number generator may be used to select which entry of the table shown in FIG. 18 to use. It is appreciated that the lookup table will depend on the window time and the table illustrated is for a 1 second window time.

a) DC Conversion

Another example, for pseudo randomizing the process of reducing the load is in the case where the AC voltage is rectified to a DC voltage. The DC voltage can then be used to power the load and can be modulated accordingly.

Figure 20A:
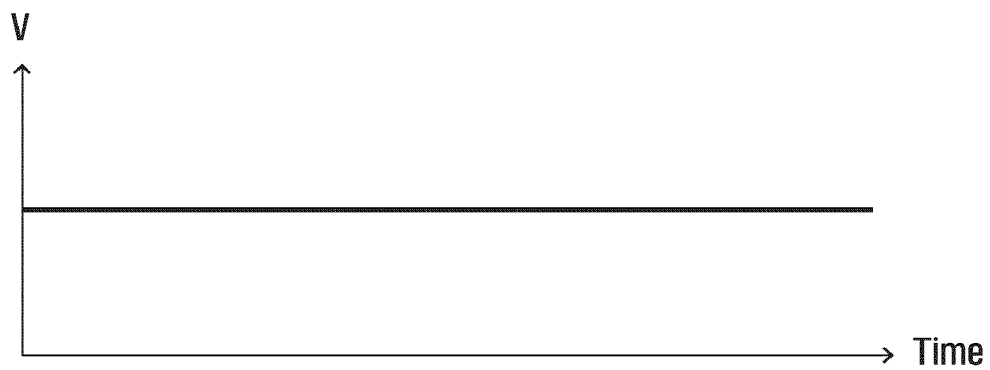
FIGS. 20A and 20B illustrate examples of rectified DC signals.
Figure 20B:
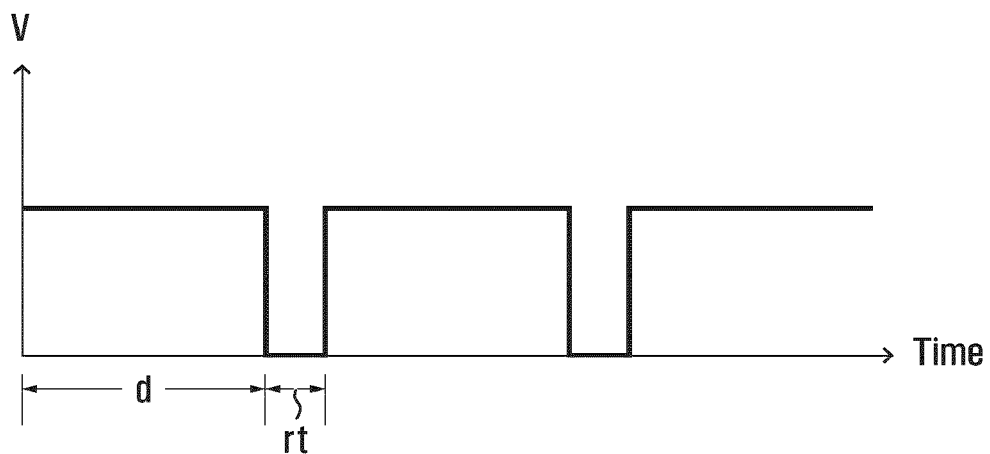

FIG. 20A shows an example of a DC voltage that has been rectified from an AC voltage by the power controller 32. FIG. 20B shows an example of a DC voltage that has been rectified from an AC voltage by the power controller 32 and where the DC voltage is controlled by pulse width modulation to achieve the target RMS voltage.

The window time may correspond in time with one or more full cycles of the AC signal that is rectified to DC. That is, the window time may be a positive integer multiple of the cycle time of the AC signal.

It is appreciated that in this example, the power electronics 46 of the power control device 32 further include electronics for rectifying an AC signal to a DC signal.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for the purpose of describing, but not limiting, the invention. Various modifications and enhancements will become apparent to those of ordinary skill in the art and are within the scope of the invention, which is defined by the appended claim(s).

The invention claimed is:

1. A power control device for controlling an electrical consumption of an individual electrical load supplied with electrical energy from a power distribution network, the power control device comprising:
   a. an input for receiving information identifying a presence of a power generation deficit in the power distribution network;
   b. a control entity;
   c. power electronics for regulating a supply of electrical energy from the power distribution network to the individual electrical load, the supply of electrical energy having sinusoidal voltage cycles, each sinusoidal voltage cycle including a positive half-cycle and a negative half-cycle, the control entity being configured for:
      i. in response to a power generation deficit in the power distribution network, selecting a reduced non-nil electrical consumption level for the individual electrical load among a plurality of possible reduced non-nil electrical consumption levels;
      ii. control the power electronics to perform a modulation strategy on the AC voltage waveform of the supply of electrical energy to the individual electrical load to reduce an RMS voltage of the supply of electrical energy to the individual electrical load to achieve the selected reduced non-nil electrical consumption level while maintaining flicker, observable as a visible change in brightness of a lamp due to voltage fluctuations, in the supply of electrical energy to a level acceptable as defined in anyone of International Electrotechnical Standards IEC 61000-3-3, IEC 61000-3-11 and/or IEC 61000-3-12, wherein the modulation strategy includes reducing a number of half-cycles of the AC voltage waveform of the supply of electrical energy in a time period based on the selected reduced non-nil electrical consumption level.

2. The power control device as defined in claim 1, wherein the individual electrical load is located into a dwelling having a power distribution sub-network to distribute electrical energy received from the power distribution network to electrical devices connected to the power distribution sub-network, the power electronics are controlled to maintain flicker in the supply of electrical energy throughout the power distribution sub-network to a level acceptable as defined in anyone of International Electrotechnical Standards IEC 61000-3-3, IEC 61000-3-11 and/or IEC 61000-3-12.

3. The power control device as defined in claim 2, wherein the power electronics are controlled to maintain a factor $P_{st}$ (perception of light flicker in the short term) of the electrical energy throughout the power distribution network at a value of 1.0 or less and/or a factor $P_{lt}$ (perception of light flicker in the long term) of the electrical energy throughout the power distribution network at a value of 0.65 or less.

4. The power control device as defined in claim 1, wherein the individual electrical load is located into a dwelling receiving electrical energy from the power distribution network through a low voltage transformer, the dwelling being a first dwelling, the low voltage transformer also supplying electrical power to a second dwelling, the power electronics are controlled to maintain flicker throughout the electrical distribution path of the first and the second dwelling supplied by the low voltage transformer to a level acceptable as defined in anyone of International Electrotechnical Standards IEC 61000-3-3, IEC 61000-3-11 and/or IEC 61000-3-12.

5. The power control device as defined in claim 1, wherein the individual electrical load is located into a dwelling receiving electrical energy from the power distribution network which in turn receives electrical energy from a medium voltage transformer, the medium voltage transformer of the power distribution network configured to supply electrical energy to a plurality of low voltage transformers, where each low voltage transformer supplies one or more dwellings, the power electronics are controlled to maintain flicker throughout the electrical distribution path of the medium voltage transformer to a level acceptable as defined in anyone of International Electrotechnical Standards IEC 61000-3-3, IEC 61000-3-11 and/or IEC 61000-3-12.

6. The power control device as defined in claim 1, including one or more processors and a machine-readable storage encoded with software for execution by the one or more processors to implement the control entity.

7. The power control device as defined in claim 6, wherein the supply of electrical energy distributed throughout the power distribution network having sinusoidal voltage cycles, each sinusoidal voltage cycle including a positive half-cycle and a negative half-cycle, the control entity being configured for determining a combination of half-cycles to block from the electrical energy supplied to the individual electrical load corresponding to the selected reduced non-nil electrical consumption level.

8. The power control device as defined in claim 7, wherein the machine-readable storage including a data structure mapping the plurality of reduced non-nil electrical consumption levels to respective combinations of half-cycles to block from the electrical energy to be supplied to the individual electrical load.

9. The power control device as defined in claim 8, wherein the software implements a counter to the data structure.

10. The power control device as defined in claim 9, wherein the software operates to increment the counter at each cycle of the electrical energy in the power distribution network.

11. The power control device as defined in claim 10, wherein the software operates to randomly select a counter value when accessing the data structure for the first time upon occurrence of a power generation deficit.

12. A method for controlling an electrical consumption of an individual electrical load supplied with electrical energy from a power distribution network, the method comprising:
  a. accessing information identifying a presence of a power generation deficit in the power distribution network;
  b. an act of regulating a supply of electrical energy from the power distribution network to the individual electrical load, the supply of electrical energy having sinusoidal voltage cycles, each sinusoidal voltage cycle including a positive half-cycle and a negative half-cycle, the act of regulating including:
    i. in response to a power generation deficit in the power distribution network, selecting a reduced non-nil electrical consumption level for the individual electrical load among a plurality of possible reduced non-nil electrical consumption levels;
    ii. performing a modulation strategy on the AC voltage waveform of the supply of electrical energy to the individual electrical load for reducing an RMS voltage of the supply of electrical energy to the individual electrical load to achieve the selected reduced non-nil electrical consumption level while maintaining flicker, observable as a visible change in brightness of a lamp due to voltage fluctuations, in the supply of electrical energy to a level acceptable as defined in anyone of International Electrotechnical Standards IEC 61000-3-3, IEC 61000-3-11 and/or IEC 61000-3-12, wherein the modulation strategy includes reducing a number of half-cycles of the AC voltage waveform of the supply of electrical energy in a time period based on the selected reduced non-nil electrical consumption level.

13. The method as defined in claim 12, wherein the individual electrical load is located into a dwelling having a power distribution sub-network to distribute electrical energy received from the power distribution network to electrical devices connected to the power distribution sub-network, the reducing of the RMS voltage being performed to maintain flicker in the supply of electrical energy throughout the power distribution sub-network to a level acceptable as defined in anyone of International Electrotechnical Standards IEC 61000-3-3, IEC 61000-3-11 and/or IEC 61000-3-12.

14. The method as defined in claim 13, wherein the reducing of the RMS voltage is performed to maintain a factor $P_{st}$ (perception of light flicker in the short term) of the electrical energy throughout the power distribution network at a value of 1.0 or less and/or a factor $P_{lt}$ (perception of light flicker in the long term) of the electrical energy throughout the power distribution network at a value of 0.65 or less.

15. The method as defined in claim 12, wherein the individual electrical load is located into a dwelling receiving electrical energy from the power distribution network through a low voltage transformer, the dwelling being a first dwelling, the low voltage transformer also supplying electrical power to a second dwelling, the reducing of the RMS voltage being performed to maintain flicker throughout the electrical distribution path of the first and the second dwelling supplied by the low voltage transformer to a level acceptable as defined in anyone of International Electrotechnical Standards IEC 61000-3-3, IEC 61000-3-11 and/or IEC 61000-3-12.

16. The method as defined in claim 12, wherein the individual electrical load is located into a dwelling receiving electrical energy from the power distribution network which in turn receives electrical energy from a medium voltage transformer, the medium voltage transformer of the power distribution network configured to supply electrical energy to a plurality of low voltage transformers, where each low voltage transformer supplies one or more dwellings, the reduction of the RMS voltage being performed to maintain flicker throughout the electrical distribution path of the medium voltage transformer to a level acceptable as defined in anyone of International Electrotechnical Standards IEC 61000-3-3, IEC 61000-3-11 and/or IEC 61000-3-12.

17. The method as defined in claim 16, wherein the supply of electrical energy distributed throughout the power distribution network having sinusoidal voltage cycles, each sinusoidal voltage cycle including a positive half-cycle and a negative half-cycle, the method including determining a combination of half-cycles to block from the electrical energy supplied to the individual electrical load corresponding to the selected reduced non-nil electrical consumption level.

* * * * *